United States Patent
Choi et al.

(10) Patent No.: US 11,742,898 B2
(45) Date of Patent: Aug. 29, 2023

(54) ANTENNA ADAPTATION METHOD AND DEVICE IN WIRELESS COMMUNICATION SYSTEM

(71) Applicant: Samsung Electronics Co., Ltd., Gyeonggi-do (KR)

(72) Inventors: Seunghoon Choi, Gyeonggi-do (KR); Taehyoung Kim, Gyeonggi-do (KR); Hoondong Noh, Gyeonggi-do (KR); Jinkyu Kang, Gyeonggi-do (KR); Youngbum Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/630,801

(22) PCT Filed: Jul. 29, 2020

(86) PCT No.: PCT/KR2020/009977
§ 371 (c)(1),
(2) Date: Jan. 27, 2022

(87) PCT Pub. No.: WO2021/025362
PCT Pub. Date: Feb. 11, 2021

(65) Prior Publication Data
US 2022/0294497 A1 Sep. 15, 2022

(30) Foreign Application Priority Data
Aug. 7, 2019 (KR) .................. 10-2019-0096145

(51) Int. Cl.
*H04B 7/0413* (2017.01)
*H04B 7/06* (2006.01)
*H04B 7/08* (2006.01)

(52) U.S. Cl.
CPC ......... *H04B 7/0413* (2013.01); *H04B 7/0602* (2013.01); *H04B 7/088* (2013.01)

(58) Field of Classification Search
CPC ..... H04B 7/0413; H04B 7/0602; H04B 7/088
See application file for complete search history.

(56) References Cited

U.S. PATENT DOCUMENTS

| 9,185,705 B2 | 11/2015 | Rajagopal et al. |
| 9,882,620 B2 | 1/2018 | Guey et al. |

(Continued)

FOREIGN PATENT DOCUMENTS

| KR | 10-2018-0027526 | 3/2018 |
| KR | 10-2019-0120665 | 10/2019 |

(Continued)

OTHER PUBLICATIONS

PCT/ISA/210 Search Report issued on PCT/KR2020/009977, dated Oct. 26, 2020, pp. 11.

(Continued)

*Primary Examiner* — Rahel Guarino
(74) *Attorney, Agent, or Firm* — The Farrell Law Firm, P.C.

(57) ABSTRACT

Disclosed are an antenna adaption method and device in a wireless communication system, the method comprising the steps in which: a terminal confirms that an operation is performed in a second antenna mode; whether a synchronization signal/physical broadcast channel block (SSB) to be measured exists in an activated bandwidth part is determined; and if the SSB to be measured does not exist in the activated bandwidth part, an SSB is measured in a first measurement gap set by a base station, wherein the second antenna mode is a mode operating by being set to the number of maximum multi-input multi-output (MIMO) layers, which is less than the number of maximum MIMO layers notified by the terminal to the base station through capacity reporting.

15 Claims, 16 Drawing Sheets

(56) References Cited

U.S. PATENT DOCUMENTS

| | | | |
|---|---|---|---|
| 10,367,677 B2 | 7/2019 | Parkvall et al. | |
| 10,455,552 B2 | 10/2019 | Jang et al. | |
| 2018/0191412 A1 | 7/2018 | Suzuki et al. | |
| 2020/0100178 A1* | 3/2020 | Kim | H04B 7/046 |
| 2021/0329556 A1 | 10/2021 | Kim et al. | |

FOREIGN PATENT DOCUMENTS

| | | |
|---|---|---|
| WO | WO 2016/045467 | 3/2016 |
| WO | WO 2017/196249 | 11/2017 |

OTHER PUBLICATIONS

PCT/ISA/237 Written Opinion issued on PCT/KR2020/009977, dated Oct. 26, 2020, pp. 5.

\* cited by examiner

ANTENNA ADAPTATION METHOD AND DEVICE IN WIRELESS COMMUNICATION SYSTEM

PRIORITY

This application is a National Phase Entry of PCT International Application No. PCT/KR2020/009977, which was filed on Jul. 29, 2020, and claims priority to Korean Patent Application No. 10-2019-0096145, which was filed on Aug. 7, 2019, the entire content of each of which is incorporated herein by reference.

TECHNICAL FIELD

The disclosure relates to a wireless communication system and particularly to an antenna adaptation method and device.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

As various services can be provided according to the development of the wireless communication system as described above, schemes for smoothly providing such services are required.

DISCLOSURE OF INVENTION

Technical Problem

Disclosed embodiments are to provide a device and method for effectively providing a service through antenna adaptation in a mobile communication system.

Solution to Problem

According to the disclosure in order to solve the above problems, a method of a terminal in a wireless communication system may include identifying operating in a second antenna mode, determining whether a synchronization signal/physical broadcast channel block (SSB) to be measured exists in an activated bandwidth part; and in case that the SSB to be measured does not exist in the activated bandwidth part, measuring the SSB in a first measurement gap configured by a base station, wherein the second antenna mode is a mode operating with a configured maximum number of multi-input multi-output (MIMO) layers smaller than a maximum number of MIMO layers notified to the base station by the terminal through capability reporting, and wherein the measurement gap includes a time $T^1$ for an antenna change, a time $T_2$ for RF tuning, and an effective measurement time to measure the SSB.

In addition, a method of a base station in a wireless communication system may include receiving capability reporting information related to a maximum number of multi-input multi-output (MIMO) layers of a terminal from the terminal; and transmitting maximum MIMO layer configuration information to the terminal, wherein the maximum MIMO layer configuration information is configured for each cell or each bandwidth part, and wherein in case that a number of MIMO layers based on the maximum MIMO layer configuration information is smaller than the maximum number of MIMO layers based on the capability reporting information, a second antenna mode is configured for the terminal.

In addition, a terminal in a wireless communication system may include a transceiver; and a controller configured to identify operating in a second antenna mode, to determine whether a synchronization signal/physical broadcast channel block (SSB) to be measured exists in an activated bandwidth part, and in case that the SSB to be measured does not exist in the activated bandwidth part, to measure the SSB in a first measurement gap configured by a base station, wherein the second antenna mode is a mode operating with a configured maximum number of multi-input multi-output (MIMO) layers smaller than a maximum number of MIMO layers notified to the base station by the terminal through capability reporting, and wherein the measurement gap includes a time $T_1$ for an antenna change, a time $T_2$ for RF tuning, and an effective measurement time to measure the SSB.

In addition, a base station in a wireless communication system may include a transceiver; and a controller configured to receive capability reporting information related to a maximum number of multi-input multi-output (MIMO) layers of a terminal from the terminal, and to transmit maximum MIMO layer configuration information to the terminal, wherein the maximum MIMO layer configuration information is configured for each cell or each bandwidth part, and in case that a number of MIMO layers based on the maximum MIMO layer configuration information is smaller than the maximum number of MIMO layers based on the capability reporting information, a second antenna mode is configured for the terminal.

Advantageous Effects of Invention

The disclosed embodiments provide a device and method for effectively providing a service through antenna adaptation in a mobile communication system.

MODE FOR THE INVENTION

Figure 1:
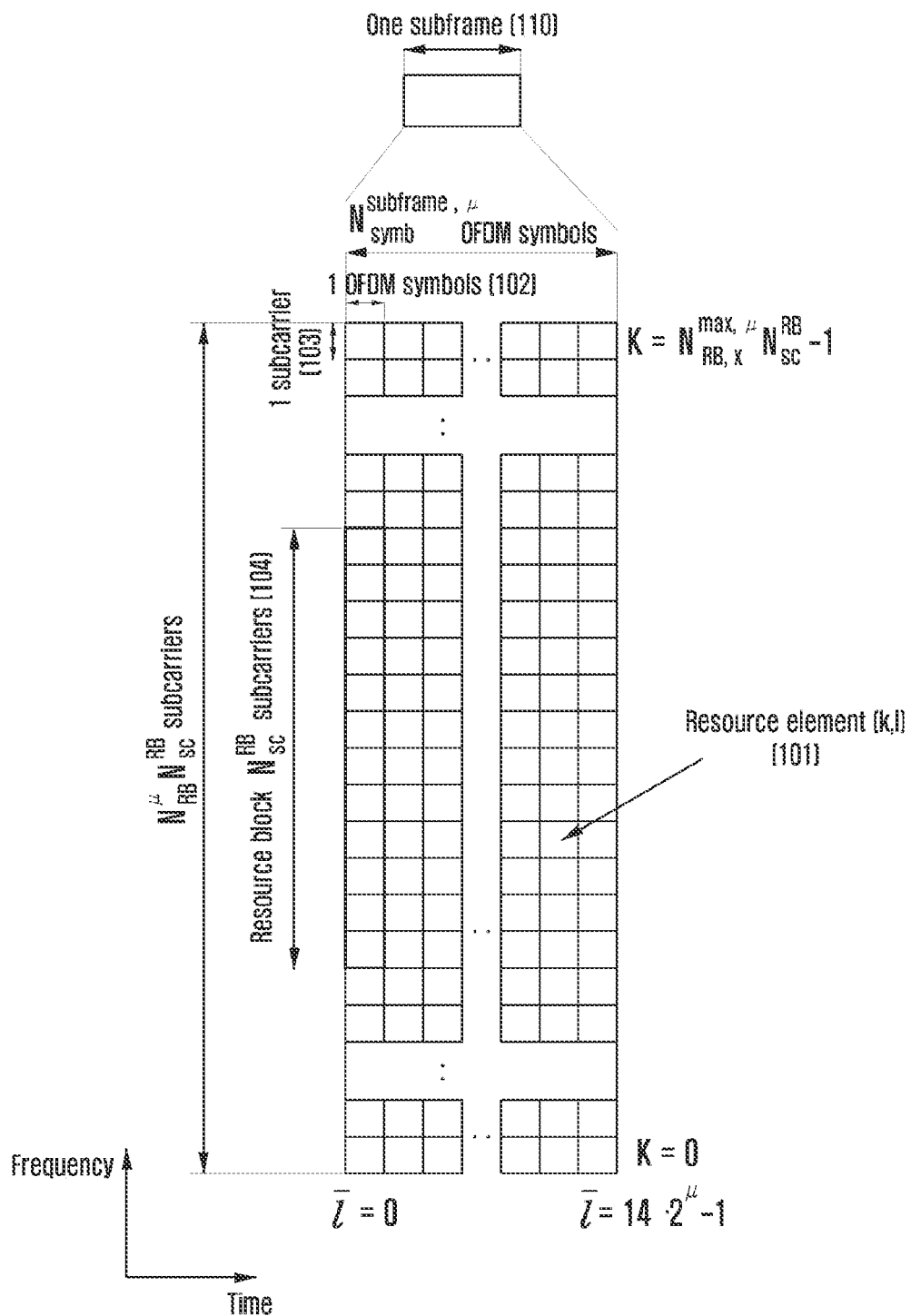
FIG. 1 is a diagram illustrating a basic structure of a time-frequency domain in a 5G system.

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements. In addition, if it is determined that a detailed description of a related function or configuration unnecessarily obscures the subject matter of the disclosure, the detailed description will be omitted. Further, the terms used herein are terms defined in consideration of functions in the disclosure, and may vary according to a user's or operator's intention or customs. Therefore, the definition should be made based on the content throughout the disclosure.

Hereinafter, a base station refer to an entity that performs resource allocation for a terminal, and may be at least one of gNode B, eNode B, Node B, a base station (BS), a radio access unit, a base station controller, or a node on a network. A terminal may include a user equipment (UE), a mobile station (MS), a cellular phone, a smart phone, a computer, or a multimedia system capable of performing a communication function. In the disclosure, downlink (DL) is a wireless transmission path of a signal from a base station to a terminal, and uplink (UL) is a wireless transmission path of a signal from a terminal to a base station.

In addition, although the LTE or LTE-A system will be described below as an example, the embodiments of the disclosure may also be applied to other communication systems having a similar technical background or channel form. For example, the disclosure may be applied to the fifth generation mobile communication technology (5G, new radio, NR) developed after the LTE-A, and the 5G mentioned below may be a concept including the existing LTE, LTE-A, and other similar services. In addition, the disclosure may be applied to other communication systems through some modifications within a range that does not significantly depart from the scope of the disclosure under the judgment of those skilled in the art.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Outgrowing what provides an initial voice-oriented service, a wireless communication system is evolving to a broadband wireless communication system that provides a high-speed and high-quality packet data service, like communication standards such as, for example, 3GPP high speed packet access (HSPA), long term evolution (LTE) (or evolved universal terrestrial radio access (E-UTRA)), LTE-advanced (LTE-A), high rate packet data (HRPD) of 3GPP2, ultra-mobile broadband (UMB), and 802.16e of IEEE.

In the LTE system, which is a representative example of the broadband wireless communication system, a downlink (DL) adopts an orthogonal frequency division multiplexing (OFDM) scheme, and an uplink (UL) adopts a single carrier frequency division multiple access (SC-FDMA) scheme. The uplink refers to a radio link in which a terminal (user equipment (UE) or mobile station (MS)) transmits data or control signals to a base station (eNode B or BS), and the downlink refers to a radio link in which a base station transmits data or control signals to a terminal. The multiple access scheme as mentioned above generally allocates and operates time-frequency resources, through which data or control information is to be transmitted, for each user so that they do not overlap each other, that is, orthogonality is established, and thereby the data or control information of each user is distinguished.

The 5G communication system, which is the communication system after the LTE, should be able to freely reflect various requirements of users and service providers, and should also support services that simultaneously satisfy various requirements. As services considered for the 5G communication system, there are enhanced mobile broadband (eMBB), massive machine type communication (mMTC), ultra-reliability low-latency communication (URLLC), and the like.

The eMBB aims to provide a more improved data transfer rate than the data transfer rate supported by the existing LTE, LTE-A, or LTE-Pro. For example, in the 5G communication system, the eMBB should be able to provide a peak data rate of 20 Gbps in the downlink and a peak data rate of 10 Gbps in the uplink from the viewpoint of one base station. Also, the 5G communication system is required to not only provide the peak data rate, but also provide an increased user-perceived data rate. In order to satisfy such requirements, it is required to improve various transmission/reception technologies including a more advanced multi-input multi-output (MIMO) transmission technology. In addition, the LTE transmits a signal using a transmission bandwidth of up to 20 MHz in the 2 GHz band, whereas the 5G communication system uses a frequency bandwidth wider than 20 MHz in the frequency band of 3 to 6 GHz or 6 GHz or more, thereby satisfying the required data rate.

At the same time, the mMTC is being considered to support application services such as the Internet of things (IoT) in the 5G communication system. In order to efficiently provide the IoT, the mMTC requires massive UE access support within a cell, improved UE coverage, improved battery life, reduced UE cost, and the like. Because the IoT is attached to a variety of sensors and devices to provide communication functions, a large number of UEs (e.g., 1,000,000 UEs/km$^2$) should be supported within a cell. In addition, because a UE that supports the mMTC is highly likely to be located in a shaded area that a cell cannot cover, such as the basement of a building, due to the characteristics of the service, the mMTC may require wider coverage compared to other services provided by the 5G communication system. A UE that supports the mMTC should be implemented with low cost and may require a very long battery life time such as 10 to 15 years because it is difficult to frequently exchange the battery of the UE.

Finally, the URLLC is a cellular-based wireless communication service used for a specific purpose (mission-critical). For example, services used for remote control for a robot or machinery, industrial automation, unmanned aerial vehicle, remote health care, emergency alert, etc. may be considered. Thus, the communication provided by the URLLC should provide very low latency and very high reliability. For example, a service that supports the URLLC should satisfy an air interface latency of less than 0.5 milliseconds and also has a requirement of a packet error rate of $10^{-5}$ or less. Therefore, for a service that supports the URLLC, the 5G system should provide a smaller transmit time interval (TTI) than other services and may also require a design having to allocate a wide resource in a frequency band to ensure the reliability of a communication link.

The three services of the 5G system, that is, eMBB, URLLC, and mMTC, may be multiplexed and transmitted in one system. In this case, such services may use different transmission/reception techniques and parameters so as to satisfy different requirements of the respective services. Of course, the 5G system is not limited to the above-described three services.

Hereinafter, a frame structure of the 5G system will be described in detail with reference to the drawings.

FIG. 1 is a diagram illustrating a basic structure of a time-frequency domain, which is a radio resource domain in which data or a control channel is transmitted, in a 5G system.

In FIG. 1, a horizontal axis represents a time domain, and a vertical axis represents a frequency domain. A basic unit of resources in the time-frequency domain is a resource element (RE) 101, which may be defined as one orthogonal frequency division multiplexing (OFDM) symbol 102 on the time axis and one subcarrier 103 on the frequency axis. In the frequency domain, N (e.g., twelve) consecutive REs may constitute one resource block (RB) 104.

Figure 2:
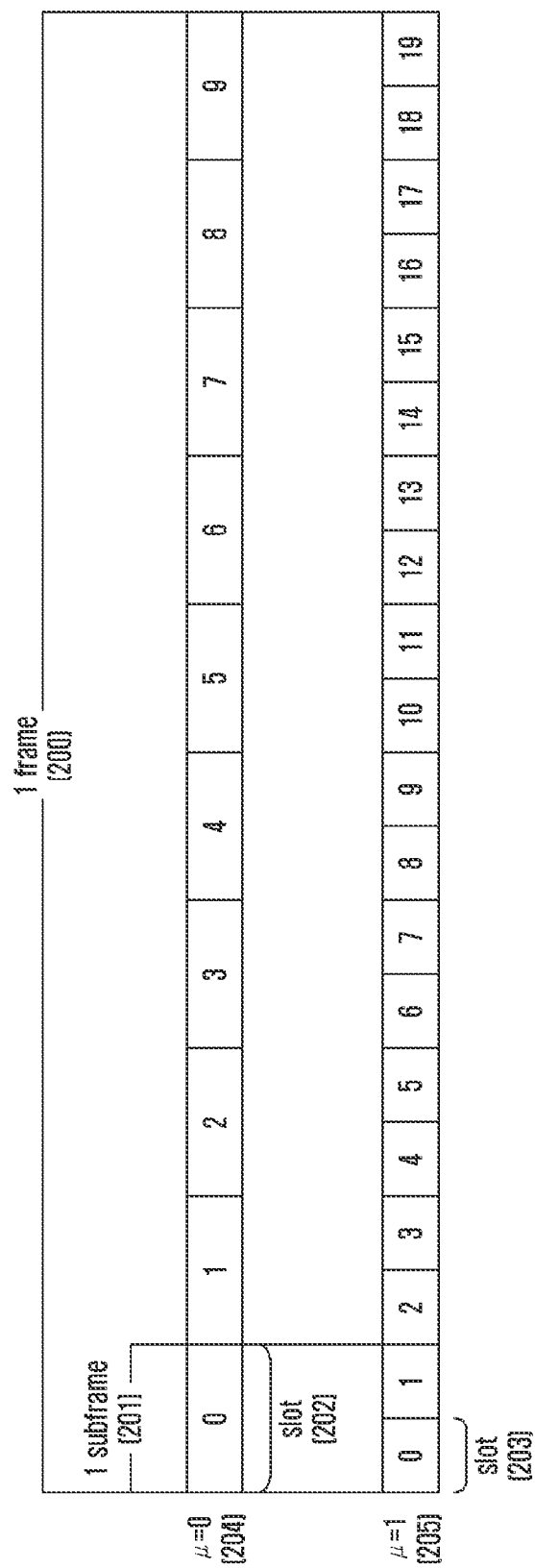
FIG. 2 is a diagram illustrating a frame, subframe, and slot structure in a 5G system.

In FIG. 2, the structure of a frame 200, a subframe 201, and a slot 202 is shown. One frame 200 may be defined as 10 ms. One subframe 201 may be defined as 1 ms, and thus one frame 200 may be composed of a total of 10 subframes 201. One slot 202 or 203 may be lot defined as 14 OFDM symbols (i.e., the number of symbols per slot ($N_{symb}^{slot}$) is 14). One subframe 201 may consist of one or a plurality of slots 202 or 203, and the number of slots 202 or 203 per one subframe 201 may vary depending on a setting value p 204 or 205 for a subcarrier spacing. In an example of FIG. 2, a case 204 of µ=0 and a case 205 of µ=1 are illustrated as subcarrier spacing setting values. In the case 204 of µ=0, one subframe 201 may consist of one slot 202, and in the case 205 of µ=1, one subframe 201 may consist of two slots 203. That is, the number of slots per subframe ($N_{slot}^{subframe,\mu}$) may vary depending on the setting value p for the subcarrier interval, and thus the number of slots per frame ($N_{slot}^{frame,\mu}$) may vary. $N_{slot}^{subframe,\mu}$ and $N_{slot}^{frame,\mu}$ according to each subcarrier spacing setting µ may be defined as Table 1 below.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, bandwidth part (BWP) configuration in the 5G communication system will be described in detail with reference to the drawings.

Figure 3:
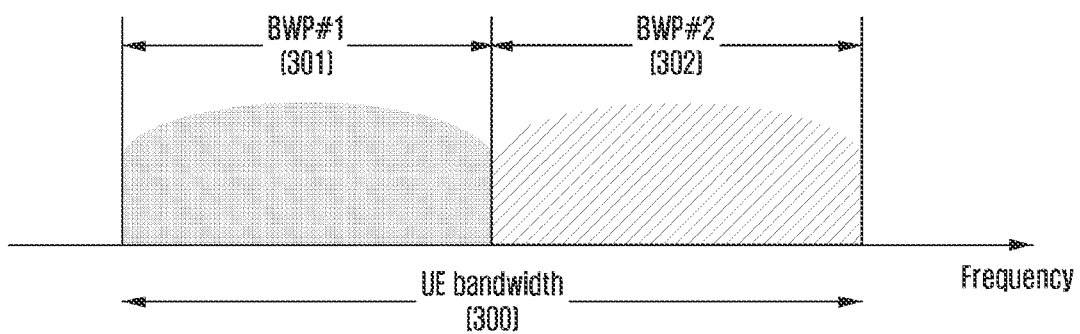
FIG. 3 is a diagram illustrating an example of bandwidth part configuration in a 5G system.

FIG. 3 is a diagram illustrating an example of bandwidth part configuration in a 5G communication system.

Shown in FIG. 3 is an example that a UE bandwidth 300 is configured as two bandwidth parts, that is, a bandwidth part #1 (BWP #1) 301 and a bandwidth part #2 (BWP #2) 302. A base station may configure one or a plurality of bandwidth parts to a UE and configure the following information for each bandwidth part.

TABLE 2

BWP ::= SEQUENCE {
bwp-Id BWP-Id,
(bandwidth part identifier)
locationAndBandwidth INTEGER(1..65536),
(bandwidth part location)
subcarrierSpacing ENUMERATED {n0, n1, n2, n3, n4, n5},
(subcarrier spacing)
cyclicPrefix ENUMERATED { extended }
(cyclic prefix)
}

Of course, the above example is not considered as limitation, and in addition to the above configuration information, various parameters related to the bandwidth part may be configured in the UE. The above information may be delivered by the base station to the UE through higher layer signaling, for example, radio resource control (RRC) signaling. The configured one or at least one among the plurality of configured bandwidth parts may be activated. Whether to activate the configured bandwidth part may be semi-statically delivered from the base station to the UE through RRC signaling or dynamically delivered through downlink control information (DCI).

According to some embodiments, the UE before RRC connection may receive configuration of an initial bandwidth part (initial BWP) for initial access from the base station through a master information block (MIB). Specifically, through the MIB in the initial access stage, the UE may receive configuration information about a search space and a control resource set (CORESET) through which a physical downlink control channel (PDCCH) (or downlink control information (DCI)) for receiving system information (which may correspond to remaining system information (RMSI) or system information block 1 (SIB1)) required for initial access can be transmitted. Each of the control resource set and the search space configured by the MIB may be regarded as identity (ID) 0.

The base station may notify, to the UE through the MIB, configuration information such as frequency allocation information, time allocation information, and numerology for the control resource set #0. In addition, the base station may notify, to the UE through the MIB, configuration information about a monitoring period and occurrence for the control resource set #0, that is, configuration information about the search space #0. The UE may regard, as an initial bandwidth part for initial access, a frequency range configured with the control resource set #0 acquired from the MIB. In this case, the identity (ID) of the initial bandwidth part may be regarded as 0. Through the configured initial bandwidth part, the UE may receive a physical downlink shared channel (PDSCH) in which the SIB is transmitted. In addition to the purpose of receiving the SIB, the initial bandwidth part may be utilized for other system information (OSI), paging, and random access.

The configuration of the bandwidth part supported by the 5G system may be used for various purposes.

According to some embodiments, in case that a bandwidth supported by the UE is smaller than the system bandwidth, this may be supported through the bandwidth part configuration.

For example, the base station may configure a frequency location (configuration information 2) of the bandwidth part to the UE, so that the UE can transmit and receive data at a specific frequency location within the system bandwidth.

In addition, according to some embodiments, the base station may configure a plurality of bandwidth parts to the UE for the purpose of supporting different numerologies. For example, in order to support both data transmission and reception using a subcarrier spacing of 15 kHz and a subcarrier spacing of 30 kHz to a certain UE, two bandwidth parts may be configured with the subcarrier spacings of 15 kHz and 30 kHz, respectively. Different bandwidth parts may be subjected to frequency division multiplexing (FDMA), and in order to transmit/receive data at a specific subcarrier spacing, a bandwidth part configured with the corresponding subcarrier spacing may be activated.

Also, according to some embodiments, for the purpose of reducing power consumption of the UE, the base station may configure bandwidth parts having bandwidths of different sizes to the UE. For example, if the UE supports a very large bandwidth, for example, a bandwidth of 100 MHz, and always transmits and receives data using that bandwidth, very large power consumption may occur. In particular, monitoring an unnecessary downlink control channel with a large bandwidth of 100 MHz in a situation that there is no traffic may be very inefficient in terms of power consumption. For the purpose of reducing the power consumption of the UE, the base station may configure a bandwidth part of a relatively small bandwidth, for example, a bandwidth part of 20 MHz, to the UE. In the absence of traffic, the UE may perform a monitoring operation in the 20 MHz bandwidth part, and when data occurs, the UE may transmit/receive data in the 100 MHz bandwidth part under the instruction of the base station.

When one or more bandwidth parts are configured for the UE, the base station may instruct the UE to switch the bandwidth part by using a bandwidth part indicator field in DCI. For example, in FIG. 3, if the currently activated bandwidth part of the UE is the bandwidth part #1 301, the base station may indicate to the UE the bandwidth part #2 302 with a bandwidth part indicator in DCI, and the UE may perform a bandwidth part switch to the bandwidth part #2 302 indicated by the bandwidth part indicator in DCI.

As described above, the DCI-based bandwidth part switch may be indicated by the DCI for scheduling the PDSCH or the PUSCH. Thus, upon receiving a bandwidth part switch request, the UE should be able to transmit or receive the PDSCH or the PUSCH scheduled by the DCI in the switched bandwidth part without difficulty. To this end, the standard stipulates a requirement for a delay time ($T_{BWP}$) required in a bandwidth part switch, and it may be defined, for example, as shown in Table 3 below.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | [1] | [3] |
| 1 | 0.5 | [2] | [5] |
| 2 | 0.25 | [3] | [9] |
| 3 | 0.125 | [6] | [17] |

Note 1
Depends on UE capability.
Note 2
If the BWP switch involves changing of SCS, the BWP switch delay is determined by the larger one between the SCS before BWP switch and the SCS after BWP switch.

The requirement for the bandwidth part switch delay supports type 1 or type 2 depending on the capability of the UE. The UE may report a supportable bandwidth part delay type to the base station.

In accordance with the requirement for the bandwidth part switch delay described above, upon receiving DCI including a bandwidth part switch indicator in a slot n, the UE may complete a switch to a new bandwidth part indicated by the bandwidth part switch indicator at a time point not later than a slot n+$T_{BWP}$, and perform transmission/reception for a data channel scheduled by the DCI in the new bandwidth part. When the base station intends to schedule the data channel using the new bandwidth part, it may determine the time domain resource allocation for the data channel in consideration of the bandwidth part switch delay ($T_{BWP}$) of the UE.

That is, in a method of determining the time domain resource allocation for the data channel when scheduling the data channel with the new bandwidth part, the base station may schedule the data channel after the bandwidth part switch delay. Accordingly, the UE may not expect that the DCI indicating the bandwidth part switch indicates the value of a slot offset (K0 indicating the PDCCH-to-PDSCH slot timing or K2 indicating the PDCCH-to-PUSCH slot timing) smaller than the bandwidth part switch delay ($T_{BWP}$).

If the UE receives DCI (e.g., DCI format 1_1 or 0_1) indicating a bandwidth part switch, the UE may not perform any transmission or reception during a time interval from the third symbol of a slot receiving the PDCCH including the DCI to a start point of a slot indicated by a slot offset (K0 or K2) value indicated by the time domain resource allocation indicator field in the DCI. For example, if the UE receives the DCI indicating a bandwidth part switch in a slot n, and a slot offset value indicated by the DCI is K, the UE may not perform any transmission or reception from the third symbol of the slot n to the symbol before the slot n+K (that is, the last symbol of the slot n+K−1).

Next, a synchronization signal (SS)/PBCH block in the 5G system will be described.

The SS/PBCH block (SSB) may refer to a physical layer channel block composed of a primary SS (PSS), a secondary SS (SSS), and a PBCH. Specifically, it is as follows.

PSS: This is a signal serving as a reference for downlink time/frequency synchronization and provides some information on cell ID.

SSS: This serves as a reference for downlink time/frequency synchronization and provides remaining cell ID information not provided by the PSS. Additionally, it may serve as a reference signal for demodulation of the PBCH.

PBCH: This provides essential system information necessary for the UE to transmit and receive a data channel and a control channel. The essential system information may include search space related control information indicating radio resource mapping information of a control channel, scheduling control information on a separate data channel for transmitting system information, and the like.

SS/PBCH block: The SS/PBCH block is formed of a combination of the PSS, the SSS, and the PBCH. One or a plurality of SS/PBCH blocks may be transmitted within 5 ms, and the respective transmitted SS/PBCH blocks may be distinguished by an index.

The UE may detect the PSS and the SSS in the initial access stage and decode the PBCH. The UE may acquire the MIB from the PBCH, and a control resource set #0 (which may correspond to a control resource set having a control resource set index of 0) may be configured therefrom. The UE may perform monitoring on the control resource set #0, assuming that a selected SS/PBCH block and a demodulation reference signal (DMRS) transmitted in the control resource set #0 are in quasi co-location (QCL).

The UE may receive system information via downlink control information transmitted in the control resource set #0. From the received system information, the UE may acquire configuration information related to a random access channel (RACH) required for the initial access. The UE may transmit a physical RACH (PRACH) to the base station in consideration of the selected SS/PBCH index, and the base station that receives the PRACH may acquire information on the SS/PBCH block index selected by the UE. The base station can know that the UE has selected a certain block from among the SS/PBCH blocks and is monitoring the control resource set #0 related thereto.

Next, downlink control information (DCI) in the 5G system will be described in detail.

In the 5G system, scheduling information for uplink data (or physical uplink shared channel, PUSCH) or downlink data (or physical downlink data channel, PDSCH) is delivered from the base station to the UE through DCI. The UE may monitor a DCI format for fallback and a DCI format for non-fallback with respect to the PUSCH or the PDSCH. The DCI format for fallback may be composed of a fixed field predefined between the base station and the UE, and the DCI format for non-fallback may include a configurable field.

The DCI may be transmitted through a PDCCH, which is a physical downlink control channel, through a channel coding and modulation process. A cyclic redundancy check (CRC) is attached to a DCI message payload, and the CRC may be scrambled with a radio network temporary identifier (RNTI) corresponding to the identity of the UE. Depending on the purpose of the DCI message, for example, UE-specific data transmission, a power control command, a random access response, etc., different RNTIs may be used. That is, the RNTI is not explicitly transmitted, but transmitted by being included in a CRC calculation process. Upon receiving the DCI message transmitted on the PDCCH, the UE checks the CRC by using the allocated RNTI, and if the CRC check result is correct, the UE can know that the message has been transmitted to the UE.

For example, the DCI for scheduling the PDSCH for system information may be scrambled with an SI-RNTI. The DCI for scheduling the PDSCH for a random access response (RAR) message may be scrambled with an RA-RNTI. The DCI for scheduling the PDSCH for a paging message may be scrambled with a P-RNTI. The DCI for notifying a slot format indicator (SFI) may be scrambled with an SFI-RNTI. The DCI for notifying transmit power control (TPC) may be scrambled with a TPC-RNTI. The DCI for scheduling the UE-specific PDSCH or PUSCH may be scrambled with a cell RNTI (C-RNTI).

A DCI format 0_0 may be used as a fallback DCI for scheduling the PUSCH, and in this case the CRC may be scrambled with the C-RNTI. The DCI format 0_0 in which the CRC is scrambled with the C-RNTI may include, for example, information in Table 4 below.

TABLE 4

Identifier for DCI formats - [1] bit
Frequency domain resource assignment - [ $\lceil \log_2 (N_{RB}^{UL, BWP} (N_{RB}^{UL, BWP} + 1)/2) \rceil$ ] bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC (transmit power control) command for scheduled PUSCH - [2] bits
UL/SUL (supplementary UL) indicator - 0 or 1 bit A DCI format 0_1 may be used as a non-fallback DCI for scheduling the PUSCH, and in this case the CRC may be scrambled with the C-RNTI. The DCI format 0_1 in which the CRC is scrambled with the C-RNTI may include, for example, information in Table 5 below.

TABLE 5

Carrier indicator—0 or 3 bits
UL/SUL indicator—0 or 1 bit
Identifier for DCI formats—[1] bits
Bandwidth part indicator—0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment—1, 2, 3, or 4 bits
VRB (virtual resource block)-to-PRB (physical resource block) mapping—0 or 1 bit, only for resource allocation type 1.
   0 bit if only resource allocation type 0 is configured;
   1 bit otherwise.
Frequency hopping flag—0 or 1 bit, only for resource allocation type 1.
   0 bit if only resource allocation type 0 is configured;
   1 bit otherwise.
Modulation and coding scheme—5 bits
New data indicator—1 bit
Redundancy version—2 bits
HARQ process number—4 bits
1$^{st}$ downlink assignment index—1 or 2 bits

TABLE 5-continued 1 bit for semi-static HARQ-ACK codebook;
2 bits for dynamic HARQ-ACK codebook with single HARQ-ACK codebook.
$2^{nd}$ downlink assignment index—0 or 2 bits
  2 bits for dynamic HARQ-ACK codebook with two HARQ-ACK sub-
  codebooks;
  0 bit otherwise.
TPC command for scheduled PUSCH—2 bits SRS resource indicator—$\left\lceil \log_2\left(\sum_{k=1}^{L_{max}} \binom{N_{SRS}}{k}\right)\right\rceil$ or $\lceil \log_2(N_{SRS}) \rceil$ bits $\left\lceil \log_2\left(\sum_{k=1}^{L_{max}} \binom{N_{SRS}}{k}\right)\right\rceil$ bits for non-codebook based PUSCH transmission $\lceil \log_2(N_{SRS}) \rceil$ bits for codebook based PUSCH transmission
Precoding information an number of layers—up to 6 bits
Antenna ports—up to 5 bits
SRS request—2 bits
CSI request—0, 1, 2, 3, 4, 5, or 6 bits
CBG (code block group) transmission information—0, 2, 4, 6, or 8 bits
PTRS-DMRS association—0 or 2 bits
beta_offset indicator—0 or 2 bits
DMRS sequence initialization—0 or 1 bit A DCI format 1_0 may be used as a fallback DCI for scheduling the PDSCH, and in this case the CRC may be scrambled with the C-RNTI. The DCI format 1_0 in which the CRC is scrambled with the C-RNTI may include, for example, information in Table 6 below.

TABLE 6

Identifier for DCI formats - [1] bit
Frequency domain resource assignment - [$\lceil \log_2(N_{RB}^{DL, BWP} (N_{RB}^{DL, BWP} + 1)/2) \rceil$] bits
Time domain resource assignment - X bits
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH (physical uplink control channel) resource indicator - 3 bits
PDSCH-to-HARQ feedback timing indicator - [3] bits A DCI format 1_1 may be used as a non-fallback DCI for scheduling the PDSCH, and in this case the CRC may be scrambled with the C-RNTI. The DCI format 1_1 in which the CRC is scrambled with the C-RNTI may include, for example, information in Table 7 below.

TABLE 7

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL, BWP}/P \rceil$ bits
For resource allocation type 1, $\lceil \log_2(N_{RB}^{DL, BWP} (N_{RB}^{DL, BWP} + 1)/2) \rceil$ bits
Time domain resource assignment - 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, 0r 2 bits
ZP SCI-RS trigger - 0, 1, or 2 bits
For transport block 1:
Modulation and coding scheme - 5 bits
New data indicator - 1 bit
Redundancy version - 2 bits

TABLE 7-continued

For transport block 2:
Modulation and coding scheme - 5 bits
New data indicator - 1 bit

TABLE 7-continued

Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit Hereinafter, a method of allocating time domain resources for a data channel in the 5G communication system will be described.

The base station may configure a table for time domain resource allocation information for a downlink data channel (PDSCH) and an uplink data channel (PUSCH) to the UE via higher layer signaling (e.g., RRC signaling). For the PDSCH, a table consisting of maxNrofDL-Allocations=16 entries may be configured, and for the PUSCH, a table consisting of maxNrofUL-Allocations=16 entries may be configured.

In the time domain resource allocation information, for example, PDCCH-to-PDSCH slot timing (corresponding to a time interval in slot units between the time when the PDCCH is received and the time when the PDSCH scheduled by the received PDCCH is transmitted, denoted by K0) or PDCCH-to-PUSCH slot timing (corresponding to a time interval in slot units between the time when the PDCCH is received and the time when the PUSCH scheduled by the received PDCCH is transmitted, denoted by K2), information about the location and length of a start symbol where the PDSCH or PUSCH is scheduled within a slot, a mapping type of the PDSCH or PUSCH, etc. may be included. For example, information such as Tables 8 and/or 9 below may be notified from the base station to the UE.

'time domain resource allocation' field in DCI). The UE may acquire the time domain resource allocation information for the PDSCH or PUSCH, based on the DCI received from the base station.

Hereinafter, a downlink control channel in the 5G communication system will be described in detail with reference to the drawings.

Figure 4:
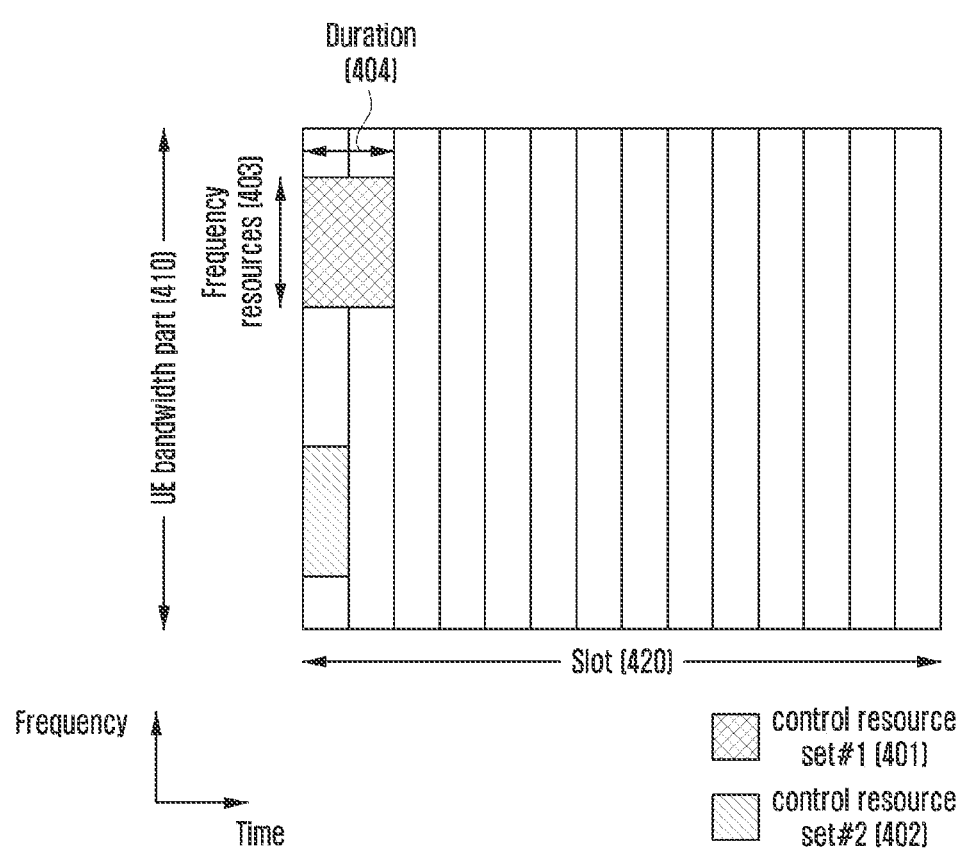
FIG. 4 is a diagram illustrating an example of configuration for a control resource set of a downlink control channel in a 5G system.

FIG. 4 is a diagram illustrating an example of a control resource set (CORESET) in which a downlink control channel is transmitted in a 5G communication system. Shown in FIG. 4 is an example that a UE bandwidth part 410 is configured on the frequency axis and two control resource sets (a control resource set #1 401 and a control resource set #2 402) are configured in one slot 420 on the time axis. The control resource sets 401 and 402 may be configured in a specific frequency resource 403 within the entire UE bandwidth part 410 on the frequency axis. On the time axis, one or a plurality of OFDM symbols may be configured, and this may be defined as a control resource set duration 404. Referring to the example shown in FIG. 4, the control resource set #1 401 is configured with a control resource set duration of 2 symbols, and the control resource set #2 402 is configured with a control resource set duration of 1 symbol.

The above-described control resource set in the 5G system may be configured by the base station to the UE through higher layer signaling (e.g., system information, MIB, RRC signaling). Configuring the control resource set to the UE refers to providing information such as a control resource set

TABLE 8

PDSCH-TimeDomainResourceAllocationList information element

PDSCH-TimeDomainResourceAllocationList ::= SEQUENCE(SIZE(1..maxNrofDL-Allocations)) OF PDSCH-TimeDomainResourceAllocation
PDSCH-TimeDomainResourceAllocation ::= SEQUENCE {
k0 INTEGER(0..32) OPTIONAL, -- Need S
(PDCCH-to-PDSCH timing, per slot)
mappingType ENUMERATED {typeA, typeB},
(PDSCH mapping type)
startSymbolAndLength INTEGER(0..127)
(start symbol and length of PDSCH)
}

TABLE 9

PUSCH-TimeDomainResourceAllocation information element

PUSCH-TimeDomainResourceAllocationList ::= SEQUENCE(SIZE(1..maxNrofUL-Allocations)) OF PUSCH-TimeDomainResourceAllocation
PUSCH-TimeDomainResourceAllocation ::= SEQUENCE {
k2 INTEGER(0..32) OPTIONAL, -- Need S
(PDCCH-to-PUSCH timing, per slot)
mappingType ENUMERATED {typeA, typeB},
(PUSCH mapping type)
startSymbolAndLength INTEGER(0..127)
(start symbol and length of PUSCH)
}

The base station may notify one of the entries in the table for the time domain resource allocation information to the UE through L1 signaling (e.g., DCI) (e.g., indicated with a identity, a frequency position of a control resource set, and a symbol duration of a control resource set. For example, information in Table 10 below may be included.

TABLE 10

```
ControlResourceSet ::= SEQUENCE {
-- Corresponds to L1 parameter 'CORESET-ID'
controlResourceSetId ControlResourceSetId,
(control resource set identity)
frequencyDomainResources BIT STRING(SIZE(45)),
(frequency axis resource allocation information)
duration INTEGER(1..maxCoReSetDuration),
(time axis resource allocation information)
cce-REG-MappingType CHOICE {
(CCE-to-REG mapping type)
interleaved SEQUENCE {
reg-BundleSize ENUMERATED {n2, n3, n6},
(REG bundle size)
precoderGranularity ENUMERATED {sameAsREG-bundle, allContiguousRBs},
interleaverSize ENUMERATED {n2, n3, n6}
(interleaver size)
shiftIndex INTEGER(0..maxNrofPhysicalResourceBlocks-1) OPTIONAL
(interleaver shift)
},
nonInterleaved NULL
},
tci-StatesPDCCH SEQUENCE(SIZE(1..maxNrofTCI-StatesPDCCH)) OF TCI-StateId
OPTIONAL,
(QCL configuration information)
tci-PresentInDCI ENUMERATED {enabled} OPTIONAL, -- Need S
}
```

In Table 10, tci-StatesPDCCH (simply referred to as a transmission configuration indication (TCI) state) configuration information may include information about one or a plurality of SS/PBCH block indexes or channel state information reference signal (CSI-RS) indexes being in QCL relationship with DMRS transmitted in the corresponding control resource set.

Figure 5:
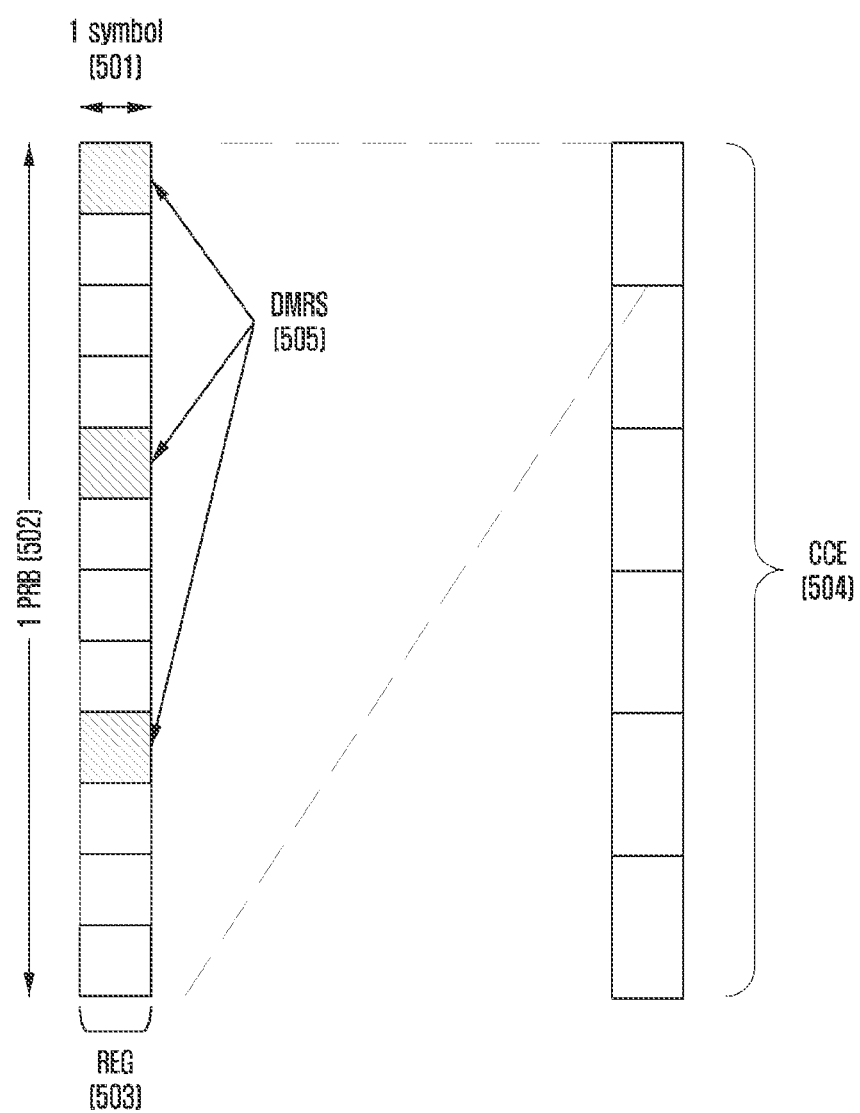
FIG. 5 is a diagram illustrating a structure of a downlink control channel in a 5G system.

FIG. 5 is a diagram illustrating an example of a basic unit of time and frequency resources constituting a downlink control channel that can be used in a 5G system. According to FIG. 5, the basic unit of time and frequency resources constituting the control channel may be referred to as a resource element group (REG) 503, and the REG 503 may be defined as one OFDM symbol 501 on the time axis and one physical resource block (PRB) 502, that is, twelve subcarriers, on the frequency axis. The base station may compose a downlink control channel allocation unit by concatenating the REGs 503.

As shown in FIG. 5, when a basic unit for downlink control channel allocation in the 5G system is referred to as a control channel element (CCE) 504, one CCE 504 may be composed of a plurality of REGs 503. In the FIG. 5 example, the REG 503 may be composed of twelve REs, and if one CCE 504 is composed of six REGs 503, one CCE 504 may be composed of seventy-two REs. When a downlink control resource set is configured, it may be composed of a plurality of CCEs 504, and a specific downlink control channel may be transmitted through mapping with one or a plurality of CCEs 504 depending on an aggregation level (AL) in the control resource set. The CCEs 504 in the control resource set are distinguished by means of numbers, and the numbers of the CCEs 504 may be assigned according to a logical mapping scheme.

The basic unit of the downlink control channel shown in FIG. 5, that is, the REG 503, may include both REs to which DCI is mapped and a region to which a DMRS 505, which is a reference signal for decoding them, is mapped. As in FIG. 5, three DMRSs 505 may be transmitted within one REG 503. The number of CCEs required to transmit the PDCCH may be 1, 2, 4, 8, or 16 depending on the aggregation level (AL), and different CCE numbers may be used to implement link adaptation of the downlink control channel. For example, in case of AL=L, one downlink control channel may be transmitted through L CCEs.

The UE needs to detect a signal without knowing information about the downlink control channel. For blind decoding, a search space indicating a set of CCEs is defined. The search space is a set of downlink control channel candidates consisting of CCEs that the UE should attempt to decode on a given aggregation level. Because there are various aggregation levels that make one bundle with 1, 2, 4, 8, or 16 CCEs, the UE may have a plurality of search spaces. A search space set may be defined as a set of search spaces in all the configured aggregation levels.

The search spaces may be classified into a common search space and a UE-specific search space. A certain group of UEs or all UEs may search the common search space of the PDCCH to receive cell-common control information such as dynamic scheduling for system information or a paging message. For example, PDSCH scheduling assignment information for SIB transmission including cell operator information may be received by searching the common search space of the PDCCH. Because a certain group of UEs or all UEs should receive the PDCCH, the common search space may be defined as a set of promised CCEs. The scheduling assignment information for the UE-specific PDSCH or PUSCH may be received by the UE searching the UE-specific search space of the PDCCH. The UE-specific search space may be defined UE-specifically as a function of the UE identity and various system parameters.

In the 5G system, parameters for the search space for the PDCCH may be configured from the base station to the UE through higher layer signaling (e.g., SIB, MIB, RRC signaling). For example, the base station may configured, to the UE, the number of PDCCH candidates in each aggregation level L, a monitoring period for the search space, a monitoring occasion in units of symbols in a slot for the search space, a search space type (a common search space or a UE-specific search space), a combination of a DCI format to be monitored in the corresponding search space and an RNTI, a control resource set index to be monitored in the search space, and the like. For example, the following information in Table 11 may be configured.

TABLE 11

```
SearchSpace ::= SEQUENCE {
-- Identity of the search space. SearchSpaceId = 0 identifies the SearchSpace configured via
PBCH(MIB) or ServingCellConfigCommon.
searchSpaceId SearchSpaceId,
(search space identifier)
controlResourceSetId ControlResourceSetId,
(control resource set identifier)
monitoringSlotPeriodicityAndOffset CHOICE {
(monitoring slot level period)
sl1 NULL,
sl2 INTEGER(0..1),
sl4 INTEGER(0..3),
sl5 INTEGER(0..4),
sl8 INTEGER(0..7),
sl10 INTEGER(0..9),
sl16 INTEGER(0..15),
sl20 INTEGER(0..19)
} OPTIONAL,
duration (monitoring length) INTEGER(2..2559)
monitoringSymbolsWithinSlot BIT STRING(SIZE(14)) OPTIONAL,
(monitoring symbol in slot)
nrofCandidates SEQUENCE {
(number of PDCCH candidates per aggregation level)
aggregationLevel1 ENUMERATED {n0, n1, n2, n3, n4, n5, n6, n8},
aggregationLevel2 ENUMERATED (n0, n1, n2, n3, n4, n5, n6, n8},
aggregationLevel4 ENUMERATED {n0, n1, n2, n3, n4, n5, n6, n8},
aggregationLevel8 ENUMERATED {n0, n1, n2, n3, n4, n5, n6, n8},
aggregationLevel16 ENUMERATED (n0, n1, n2, n3, n4, n5, n6, n8}
},
searchSpaceType CHOICE {
(search space type)
-- Configures this search space as common search space (CSS) and DCI formats to monitor.
common SEQUENCE {
(common search space)
}
ue-Specific SEQUENCE {
(UE-specific search space)
-- Indicates whether the UE monitors in this USS for DCI formats 0-0 and 1-0 or for formats
0-1 and 1-1.
formats ENUMERATED {formats0-0-And-1-0, formats0-1-And-1-1},
...
}
```

The base station may configure one or a plurality of search space sets to the UE depending on configuration information. According to some embodiments, the base station may configure a search space set 1 and a search space set 2 to the UE, configure a DCI format A scrambled with X-RNTI in the search space set 1 to be monitored in the common search space, and configured a DCI format B scrambled with Y-RNTI in the search space set 2 to be monitored in the UE-specific search space.

According to the configuration information, one or a plurality of search space sets may exist in the common search space or the UE-specific search space. For example, a search space set #1 and a search space set #2 may be configured as the common search space, and a search space set #3 and a search space set #4 may be configured as the UE-specific search space.

In the common search space, the following combination of a DCI format and an RNTI may be monitored. Of course, the following examples are not considered as a limitation.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combination of a DCI format and an RNTI may be monitored. Of course, the following examples are not considered as a limitation.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and purposes.

C-RNTI (cell RNTI): The purpose of UE-specific PDSCH scheduling

TC-RNTI (temporary cell RNTI): UE-specific PDSCH scheduling purpose

CS-RNTI (configured scheduling RNTI): The purpose of semi-statically configured UE-specific PDSCH scheduling RA-RNTI (random access RNTI): The purpose of PDSCH scheduling in the random access step P-RNTI (paging RNTI): The purpose of PDSCH scheduling in which paging is transmitted SI-RNTI (system information RNTI): The purpose of PDSCH scheduling in which system information is transmitted INT-RNTI (interruption RNTI): The purpose of informing whether puncturing for PDSCH TPC-PUSCH-RNTI (transmit power control for PUSCH RNTI): The purpose of indicating power control command for PUSCH TPC-PUCCH-RNTI (transmit power control for PUCCH RNTI): The purpose of indicating power control command for PUCCH TPC-SRS-RNTI (transmit power control for SRS RNTI): The purpose of indicating power control command for SRS The aforementioned specified DCI formats may follow the definition of Table 12 below.

TABLE 12

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, the search space of the aggregation level L in the control resource set p and the search space set s can be expressed as the following equation.

$$L \cdot \left\{ \left( Y_{p,n_{s,i}^{\mu}} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

L: Aggregation level $n_{CI}$: Carrier index $N_{CCE,p}$: The total number of CCEs existing in the control resource set p $n^{\mu}_{s,f}$: Slot index $M^{(L)}_{p,s,max}$: The number of PDCCH candidates of the aggregation level L $m_{s,n_{CI}} = 0, \ldots, M^{(L)}_{p,s,max} - 1$: PDCCH candidate index of aggregation level L $i = 0, \ldots, L-1$ $Y_{p,n_{s,f}^{\mu}} = (A_p \cdot Y_{p,n_{s,f}^{\mu}-1}) \bmod D$, $Y_{p,-1} = n_{RNTI} \neq 0$, $A_0 = 39827$, $A_1 = 39829$, $A_2 = 39839$, $D = 65537$ $n_{RNTI}$: UE identifier The value of $Y\_(p,n^{\mu}_{s,f})$ may correspond to 0 in case of the common search space.

The value of $Y\_(p,n^{\mu}_{s,f})$ may correspond to a value that varies depending on a UE's identity (C-RNTI or ID configured for the UE by the base station) and a time index in the UE-specific search space.

In the 5G system, a plurality of search space sets may be configured with different parameters (e.g., parameters in Table 11), so the set of search space monitored by the UE at every time point may vary. For example, if a search space set #1 is configured with a X-slot period, a search space set #2 is configured with a Y-slot period, and X and Y are different, the UE may monitor both the search space set #1 and the search space set #2 in a specific slot, and monitor one of the search space set #1 and the search space set #2 in a specific slot.

When a plurality of search space sets are configured for the UE, the following conditions may be considered in a method for determining a search space set to be monitored by the UE.

[Condition 1: Limitation of the Maximum Number of PDCCH Candidates]

The number of PDCCH candidates that can be monitored per slot does not exceed $M^{\mu}$. The $M^{\mu}$ may be defined as the maximum number of PDCCH candidates per slot in a cell configured with a subcarrier spacing of 15·2$^{\mu}$ kHz, and may be defined as shown in Table 13 below.

TABLE 13

| μ | Maximum number of PDCCH candidates per slot and per serving cell ($M^{\mu}$) |
|---|---|
| 0 | 44 |
| 1 | 36 |
| 2 | 22 |
| 3 | 20 |

[Condition 2: Limitation of the Maximum Number of CCEs]

The number of CCEs constituting the entire search space per slot (here, the entire search space refers to the entire CCE set corresponding to the union area of a plurality of search space sets) does not exceed $C^{\mu}$. The $C^{\mu}$ may be defined as the maximum number of CCEs per slot in a cell configured with a subcarrier spacing of 15·2$^{\mu}$ kHz, and may be defined as shown in Table 14 below.

TABLE 14

| μ | Maximum number of CCEs per slot and per serving cell ($C^{\mu}$) |
|---|---|
| 0 | 56 |
| 1 | 56 |
| 2 | 48 |
| 3 | 32 |

For convenience of explanation, a situation in which both the conditions 1 and 2 are satisfied at a specific time point is defined as "condition A". Accordingly, not satisfying the condition A may mean not satisfying at least one of the above conditions 1 and 2.

Depending on the configuration of the search space sets by the base station, the condition A may not be satisfied at a specific time point. If the condition A is not satisfied at a specific time point, the UE may select and monitor only some of the search space sets configured to satisfy the condition A at the corresponding time point, and the base station may transmit the PDCCH in the selected search space set.

A method of selecting some search spaces from among all the configured search space set may be as follows.

[Method 1]

If the condition A for PDCCH is not satisfied at a specific time point (slot),

The UE (or the base station) may preferentially select, from among search space sets existing at that time point, a search space set having a search space type configured as the common search space over a search space set configured as the UE-specific search space.

When all search space sets configured as the common search space are selected (that is, when the condition A is satisfied even after all search spaces configured as the common search space are selected), the UE (or the base station) may select search space sets configured as the UE-specific search space. In this case, if there are a plurality of search space sets configured as the UE-specific search space, a search space set having a low search space set index may have a higher priority. In consideration of such a priority, the UE and the base station may select the UE-specific search space sets within a range in which the condition A is satisfied.

Figure 6:
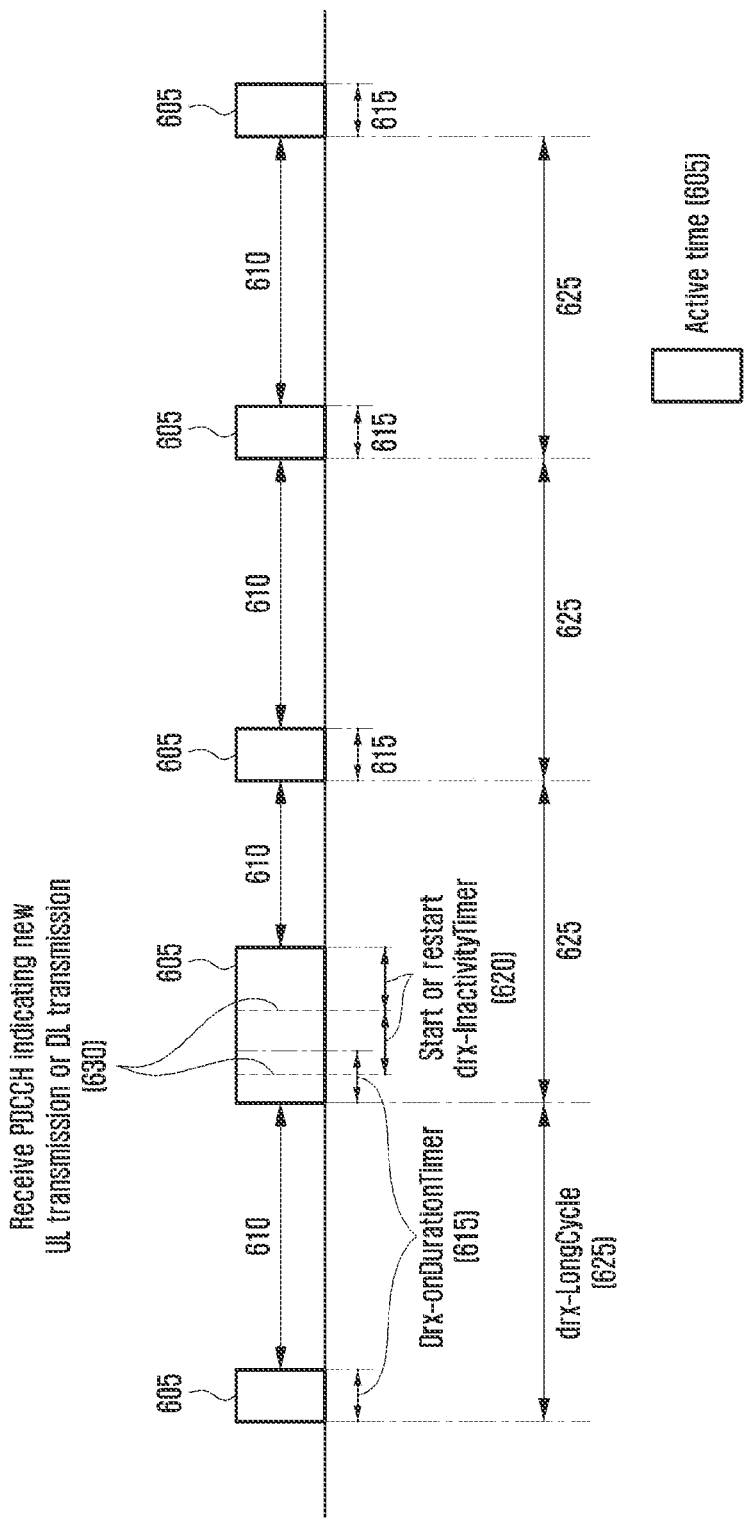
FIG. 6 is a diagram illustrating an example of a DRX operation in a 5G system.

FIG. 6 is a diagram illustrating a discontinuous reception (DRX) in a 5G system.

The discontinuous reception (DRX) is an operation that the UE using a service discontinuously receives data in an RRC connected state in which a radio link is established between the base station and the UE. When the DRX is applied, the UE may turn on a receiver at a specific time point to monitor a control channel and, if there is no data received for a certain period of time, turn off the receiver to reduce power consumption thereof. The DRX operation may be controlled by a MAC layer device, based on various parameters and timers.

Referring to FIG. 6, an active time 605 is a time during which the UE wakes up every DRX cycle and monitors the PDCCH. The active time 605 may be defined as follows.

- A drx-onDurationTimer, a drx-InactivityTimer, a drx-RetransmissionTimerDL, a drx-RetransmissionTimerUL, or a ra-ContentionResolutionTimer is running; or
- A scheduling request is sent on PUCCH and is pending; or
- A PDCCH indicating a new transmission addressed to the C-RNTI of the MAC entity has not been received after successful reception of a Random Access Response for the Random Access Preamble not selected by the MAC entity among the contention-based Random Access Preamble.

The drx-onDurationTimer, the drx-InactivityTimer, the drx-RetransmissionTimerDL, the drx-RetransmissionTimerUL, the ra-ContentionResolutionTimer, etc. are timers whose values are configured by the base station, and have a function of configuring the UE to monitor the PDCCH in a situation where a predetermined condition is satisfied.

The drx-onDurationTimer 615 is a parameter for setting the minimum time during which the UE is awake in the DRX cycle. The drx-InactivityTimer 620 is a parameter for setting an additional awake time of the UE when a PDCCH 630 indicating new uplink transmission or downlink transmission is received. The drx-RetransmissionTimerDL is a parameter for setting the maximum time during which the UE is awake in order to receive downlink retransmission in the downlink HARQ procedure. The drx-RetransmissionTimerUL is a parameter for setting the maximum time during which the UE is awake in order to receive an uplink retransmission grant in the uplink HARQ procedure. The drx-onDurationTimer, the drx-InactivityTimer, the drx-RetransmissionTimerDL, and the drx-RetransmissionTimerUL may be configured with, for example, a time, the number of subframes, the number of slots, and the like. The ra-ContentionResolutionTimer is a parameter for monitoring the PDCCH in the random access procedure.

An inactive time 610 is a time configured not to monitor the PDCCH or a time configured not to receive the PDCCH during the DRX operation. The remaining time excluding the active time 605 from the entire time for performing the DRX operation may be the inactive time 610. If the UE does not monitor the PDCCH during the active time 605, it may enter a sleep or inactive state and thereby reduce power consumption.

The DRX cycle refers to a cycle in which the UE wakes up and monitors the PDCCH. That is, it refers to a time interval from UE's monitoring a PDCCH to monitoring the next PDCCH or an on-duration generation period. There are two types of DRX cycle, i.e., a short DRX cycle and a long DRX cycle 625. The short DRX cycle may be optionally applied.

The long DRX cycle (drx-LongCycle) 625 is the longest of two DRX cycles configured in the UE. While operating in the long DRX cycle, the UE starts again the drx-onDurationTimer 615 when the long DRX cycle 625 has elapsed from a starting point (e.g., start symbol) of the drx-onDurationTimer 615. In case of operating in the long DRX cycle 625, the UE may start the drx-onDurationTimer 615 in a slot after drx-SlotOffset in a subframe satisfying Equation 2 below. Here, drx-SlotOffset refer to a delay before the drx-onDurationTimer 615 starts. For example, drx-SlotOffset may be configured with a time, the number of slots, and the like.

$$[(SFN \times 10)+\text{subframe number}] \text{modulo}(\text{drx-Long-Cycle})=\text{drx-StartOffset} \quad \text{[Equation 2]}$$

In this case, drx-LongCycleStartOffset and drx-StartOffset may be used to define a subframe in which the long DRX cycle 625 will start. For example, drx-LongCycleStartOffset may be configured with a time, the number of subframes, the number of slots, and the like.

Hereinafter, a method of configuring a TCI state for a DMRS (PDCCH DMRS or PDSCH DMRS) in the 5G communication system will be described in detail.

The base station can configure and indicate the TCI state for the DMRS through appropriate signaling. According to the above description, the base station can configure and indicate the TCI state for the DMRS through appropriate signaling. The TCI state is for announcing a QCL relationship between the DMRS and another RS or channel. Saying that a certain reference antenna port A (reference RS #A) and another target antenna port B (target RS #B) are QCLed to each other means that the UE is allowed to apply some or all of large-scale channel parameters estimated at the antenna port A to channel measurement from the antenna port B. In the QCL relationship, it may be necessary to associate different parameters depending on situations, such as 1) time tracking affected by average delay and delay spread, 2) frequency tracking affected by Doppler shift and Doppler spread, 3) radio resource management (RRM) affected by average gain, and 4) beam management (BM) affected by spatial parameter. Accordingly, the NR supports four types of QCL relationships as shown in Table 15 below.

TABLE 15

| QCL type | Large-scale characteristics |
| --- | --- |
| A | Doppler shift, Doppler spread, average delay, delay spread |
| B | Doppler shift, Doppler spread |
| C | Doppler shift, average delay |
| D | Spatial Rx parameter |

The spatial RX parameter may collectively refer to some or all of various parameters such as angle of arrival (AoA), power angular spectrum (PAS) of AoA, angle of departure (AoD), PAS of AoD, transmit/receive channel correlation, transmit/receive beamforming, and spatial channel correlation.

The QCL relationship can be configured to the UE through RRC parameter TCI-State and QCL-Info as shown in Table 16 below. Referring to Table 16, the base station may configure one or more TCI states to the UE and informs the RS referring to the ID of the TCI state, that is, up to two QCL relationships (qcl-Type1, qcl-Type2) for the target RS.

In this case, each QCL information (QCL-Info) included in each TCI state includes a serving cell index and bandwidth part index (BWP index) of a reference RS indicated by that QCL information, the type and ID of the reference RS, and the QCL type as shown in Table 15 above.

TABLE 16

TCI-State ::= SEQUENCE {
tci-StateId TCI-StateId,
(ID of the corresponding TCI state)
qcl-Type1 QCL-Info,
(QCL information of the first reference RS of the RS (target RS) referring to the corresponding TCI state ID)
qcl-Type2 QCL-Info OPTIONAL, -- Need R
(QCL information of the second reference RS of the RS (target RS) referring to the corresponding TCI state ID)
...
}
QCL-Info ::= SEQUENCE {
cell ServCellIndex OPTIONAL, -- Need R
(serving cell index of the reference RS indicated by the corresponding QCL information)
bwp-Id BWP-Id OPTIONAL, -- Cond CSI-RS-Indicated
(BWP index of the reference RS indicated by the corresponding QCL information)
referenceSignal CHOICE {
csi-rs NZP-CSI-RS-ResourceId,
ssb SSB-Index
(either CSI-RS ID or SSB ID indicated by the corresponding QCL information)
},
qcl-Type ENUMERATED {typeA, typeB, typeC, typeD},
...
}

Figure 7:
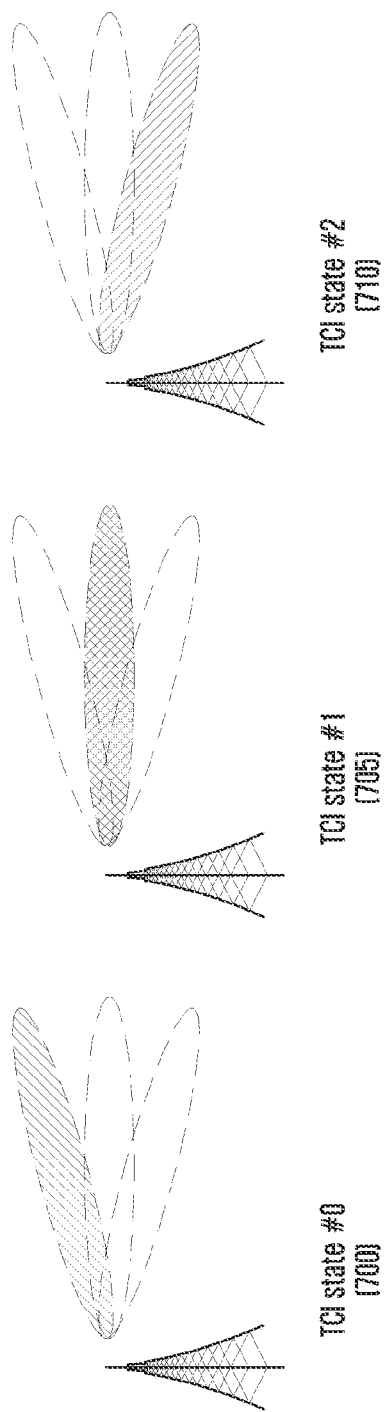
FIG. 7 is a diagram illustrating an example of base station beam allocation depending on TC state configuration in a 5G system.

FIG. 7 is a diagram illustrating an example of base station beam allocation depending on TCI state configuration in a 5G system. Referring to FIG. 7, the base station may transmit information on N different beams to the UE through N different TCI states. For example, when N=3 as shown in FIG. 7, the base station may enable QCL-TYPE2 parameters included in three TCI states 700, 705, and 710 to be associated with respective CSI-RSs or SSBs corresponding to different beams, and enable the QCL relationship to be configured as QCL type D. Through the base station may announce that antenna ports referring to the different TC states 700, 705, and 710 are associated with different spatial reception parameters, that is, different beams. Specifically, TCI state combinations applicable to the PDCCH DMRS antenna port are shown in Table 17 below. The fourth row in Table 17 is a combination assumed by the UE before RRC configuration, and configuration after RRC is not possible.

TABLE 17

| Valid TCI state Configuration | DL RS 1 | qcl-Type1 | DL RS 2 (if configured) | qcl-Type2 (if configured) |
| --- | --- | --- | --- | --- |
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
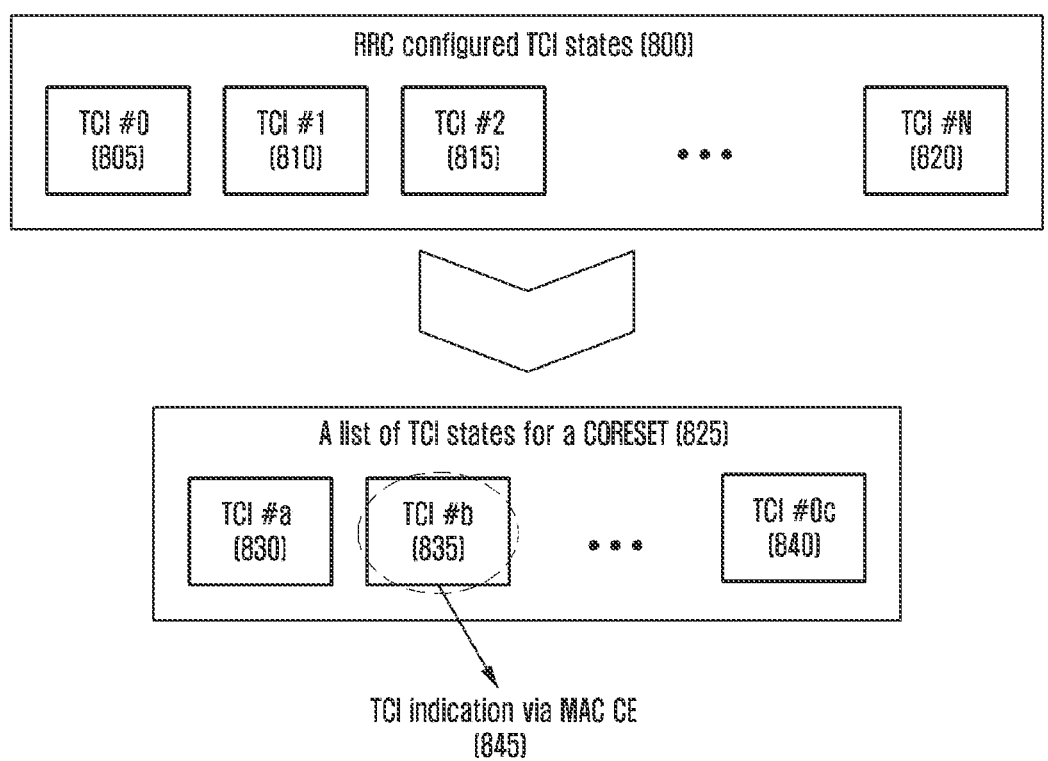
FIG. 8 is a diagram illustrating an example of a TC state allocation method for a PDCCH in a 5G system.

The NR supports a hierarchical signaling method as shown in FIG. 8 for dynamic allocation for the PDSCH beam. Referring to FIG. 8, the base station may configure N TCI states 805, 810, . . . , 820 to the UE through RRC signaling 800. Then the base station may indicate M TCI states among the TCI states 805, 810, . . . , 820 for the PDSCH to the UE through MAC CE signaling. Then the base station may indicate one TCI state among the TCI states indicated by the MAC CE signaling to the UE through DCI. Then the UE may receive the PDSCH based on beam information included in the TCI state indicated by the DCI signaling. Before receiving an activation command via the MAC CE after the TCI state is configured with upper layer signaling, the UE may assume that the DMRS of the PDSCH has been QCLed with the SS/PBCH block identified in the initial connection procedure.

The NR supports a hierarchical signaling method as shown in FIG. 8 for dynamic allocation for the PDSCH beam. Referring to FIG. 8, the base station may configure N TCI states 805, 810, . . . , 820 to the UE through RRC signaling 800 and configure some of them as TCIs state for a CORESET 825. Then the base station may indicate one of the TCI states 830, 835, and 840 for the CORESET to the UE through MAC CE signaling 845. Then the UE receives the PDCCH based on beam information included in the TCI state indicated by the MAC CE signaling.

For a certain control resource set (CORESET), the base station may configure one or a plurality of TCI states to the UE and activate one of the configured TCI states through a MAC CE activation command. For example, TCI states {TCI state #0, TCI state #1, TCI state #2} may be configured for a CORESET #1, and the base station may transmit an activation command to the UE to assume the TCI state #0 as the TCI state for the CORESET #1 through the MAC CE. Based on the activation command for the TCI state received via the MAC CE, and based on QCL information in the activated TCI state, the UE may properly receive the DMRS of the corresponding CORESET.

For a CORESET configured with an index of 0 (CORESET #0), if the UE fails to receive the MAC CE activation command for the TCI state of the CORESET #0, the UE may assume that the DMRS transmitted in the CORESET #0 has been QCLed with the SS/PBCH block identified the initial connection procedure or the non-contention based random access procedure which is not triggered by the PDCCH command. For a CORESET configured with an index of other value than 0 (CORESET #X), if the UE has not been configured for the TC state for the CORESET #X, or has been configured for one or more TCI states, but fails to receive the MAC CE activation command to activate one of them, the UE may assume that the DMRS transmitted in the CORESET #X has been QCLed with the SS/PBCH block identified in the initial connection procedure.

Figure 9:
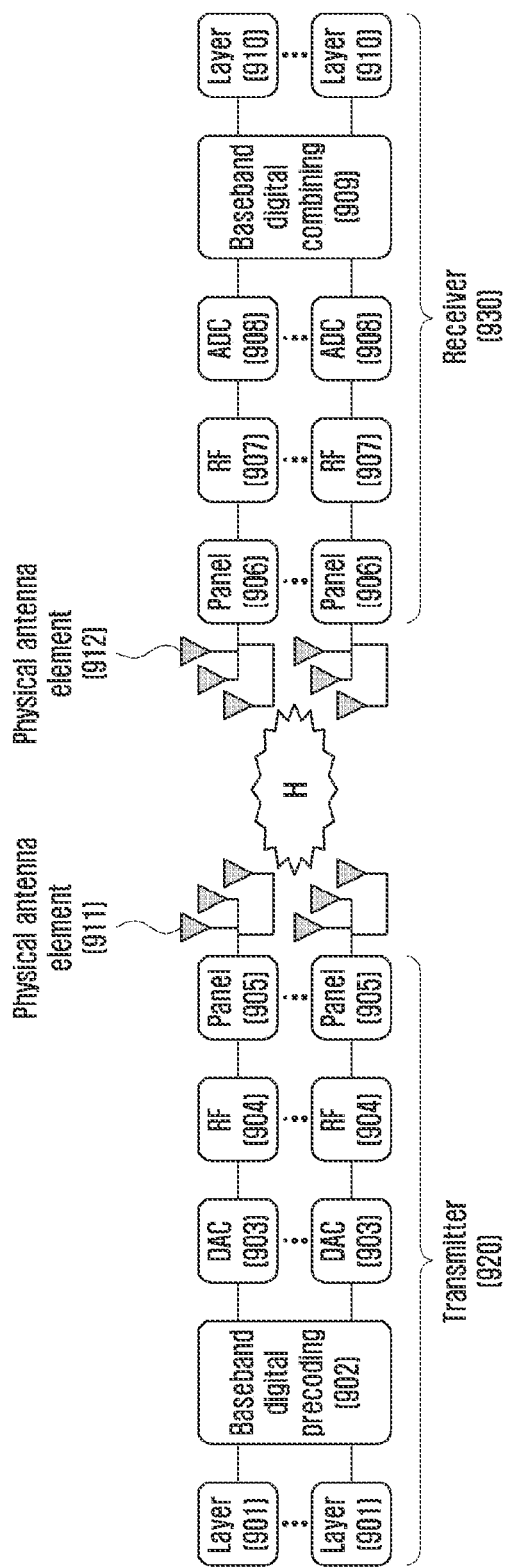
FIG. 9 is a diagram illustrating an example of a transmitter and receiver structure considered in some embodiments of the disclosure.

FIG. 9 is a diagram illustrating an example of a transmitter and receiver structure and an antenna structure considered in the disclosure.

First, a transmitter 920 may be composed of a layer 901, a baseband digital precoding 902, a digital-to-analog (DA) converter 903, a radio frequency (RF) 904, a panel 905, and a physical antenna element 911. At the transmitter, a digital signal may be transmitted through one or a plurality of layers 901. The signal of the layer 901 may be converted from a digital signal to an analog signal through the DA converter 903 after the baseband digital precoding 902 is applied. The converted analog signal may be converted into a signal of a corresponding transmission band through the RF 904, and analog beamforming may be performed. The RF 904 may be a concept including both an RF circuit and an RF path, and the RF path may include elements such as a mixer, a power amplifier, and a phase shifter. The transmitter may form analog beamforming through the phase shifter and convert into an RF signal. The signal converted at the RF 904 may be transmitted to a receiver through the panel 905 and the physical antenna element 911. The panel may correspond to an aggregate composed of one or a plurality of physical antenna elements 911. The panel 905 may be connected to some components of the RF 920, and thus regarded as a unit of an antenna set in which analog beamforming is performed.

Next, a receiver 930 may be constructed in the reverse order of the same structure as the transmitter structure. That is, the receiver may be composed of a physical antenna element 912, a panel 906, an RF 907, an AD converter 908, a baseband digital combining 909, and a layer 910. The receiver may receive the signal transmitted from the transmitter through the physical antenna element 912. At the panel 906 and the RF 907, analog reception beamforming may be applied to the signal received by physical antenna element 912. The signal may then be converted from an analog signal to a digital signal via the AD converter 908. The received digital signal may be divided into signals of the respective layers 910 through baseband digital combining 909.

Hereinafter, in describing an embodiment of the disclosure, in the downlink, the transmitter and the receiver may correspond to a base station and a UE, respectively, and in the uplink, the transmitter and the receiver may correspond to a UE and a base station, respectively.

Hereinafter, in describing an embodiment of the disclosure, an element composed of at least one or a combination of the RF, the panel, and the physical antenna element shown in FIG. 9 will be collectively referred to as 'antenna'. In the downlink where the UE corresponds to the receiver, the antenna of the UE corresponds to a receive antenna, and in the uplink where the UE corresponds to the transmitter, the antenna of the UE may correspond to a transmit antenna. The UE may activate N (≥M) antennas to transmit or receive M layers. The N antennas may refer to N sets each of which is composed of at least one or a combination of the RF, the panel, and the physical antenna element required to receive N layers. For example, the N antennas may be composed of A RFs, B panels, and C physical antenna elements.

Hereinafter, embodiments of the disclosure will be described in detail with accompanying drawings. Although embodiments of the disclosure will be described below using the 5G system as an example, such embodiments may also be applied to other communication systems having a similar technical background or channel form. For example, the disclosure may be applied to LTE, LTE-A, or mobile communication technology to be developed after 5G. Thus, the disclosure may be applied to other communication systems through some modifications within a range that does not significantly depart from the scope of the disclosure under the judgment of those skilled in the art.

In addition, if it is determined that a detailed description of a related function or configuration unnecessarily obscures the subject matter of the disclosure, the detailed description will be omitted. Further, the terms used herein are terms defined in consideration of functions in the disclosure, and may vary according to a user's or operator's intention or customs. Therefore, the definition should be made based on the content throughout the disclosure.

In the following description of the disclosure, higher layer signaling may be signaling corresponding to at least one or a combination of the following signaling types.

MIB
SIB or SIB X (X=1, 2, ... )
RRC
MAC (medium access control) CE (control element)

In addition, L1 signaling may be signaling corresponding to at least one or a combination of signaling methods using the following physical layer channels or signaling.

PDCCH
DCI
UE-specific DCI
Group common DCI
Common DCI
Scheduling DCI (for example, DCI used for scheduling downlink or uplink data)
Non-scheduling DCI (for example, DCI not for the purpose of scheduling downlink or uplink data)
PUCCH (physical uplink control channel)
UCI (uplink control information)

First Embodiment

In some embodiments of the disclosure, the UE may receive the maximum number of downlink and/or uplink MIMO layers configured from the base station through higher layer signaling. In this disclosure, the maximum number of DL MIMO layers is denoted by $L_{max,DL}$, and the maximum number of UL MIMO layers is denoted by $L_{max,UL}$. In addition, the maximum number of MIMO layers is denoted by $L_{max}$ without distinction between DL and UL. That is, the maximum number of MIMO layers may correspond to at least one or both of the maximum number of DL MIMO layers and the maximum number of UL MIMO layers.

The following methods may be considered as a method for the base station to configure the maximum number of MIMO layers to the UE.

[Method 1-1]

In some embodiments of the disclosure, the base station may configure the maximum number of MIMO layers for each cell to the UE. If the maximum number of MIMO layers is configured for each cell, the UE may assume that the same maximum number of MIMO layers is configured for all bandwidth parts configured in the corresponding cell.

[Method 1-2]

In some embodiments of the disclosure, the base station may configure the maximum number of MIMO layers for each bandwidth part in a cell to the UE. If the maximum number of MIMO layers is configured for each bandwidth part, the UE may assume that for an activated bandwidth part, the maximum number of MIMO layers configured in the corresponding bandwidth part is the maximum number of MIMO layers.

[Method 1-3]

In some embodiments of the disclosure, the base station may configure the maximum number of MIMO layers for each cell to the UE, and additionally configure the maximum number of MIMO layers for a specific bandwidth part in a cell. The specific bandwidth part may correspond to an initial bandwidth part or a default bandwidth part (default BWP). If a bandwidth part other than the aforementioned specific bandwidth part is activated, the UE may assume that the maximum number of MIMO layers configured for each cell is the maximum number of MIMO layers, and if the specific bandwidth part is activated, the UE may assume that the maximum number of MIMO layers configured for the specific bandwidth part is the maximum number of MIMO layers.

In some embodiments of the disclosure, the UE may always activate all the antennas regardless of the configured maximum number of MIMO layers. The total number of antennas may correspond to the number of antennas based on the maximum number of MIMO layers notified by the UE to the base station through capability reporting. For example, the UE may report its capability to the base station as $L_{max}=X$, and the base station may configure $L_{max}=Y(\leq X)$ for the UE. In this case, the UE may activate X antennas. An operation of activating a specific number of antennas regardless of the configured maximum number of MIMO layers will be referred to as a 'first antenna mode'. The first antenna mode may also be called, for example, a default mode, a normal mode, or the like.

In some embodiments of the disclosure, for the purpose of reducing power consumption, the UE may activate or deactivate the antenna based on the configured maximum number of MIMO layers. The UE may activate the minimum number of antennas for receiving the configured maximum number of MIMO layers, thereby reducing power consumption due to antenna activation. For example, in case that the base station configures $L_{max}=X$ as the configuration per cell to the UE, the UE may activate X antennas for the corresponding cell. In another example, in case that the base station configures $L_{max}=X$ for bandwidth part #1 and $L_{max}=Y$ for bandwidth part #2 as the configuration per bandwidth part to the UE, the UE may activate X antennas in case that the activated bandwidth part of the UE is the bandwidth part #1, and activate Y antennas in case that the activated bandwidth part of the UE is the bandwidth part #2. In still another example, in case that the base station configures $L_{max}=X$ as the configuration per cell to the UE and additionally configure $L_{max}=Y$ for a specific bandwidth part (e.g., initial bandwidth part, default bandwidth part, etc.), the UE may activate X antennas in case that a bandwidth part other than the specific bandwidth part is activated, and activate Y antennas in case that the specific bandwidth part is activated.

As described above, a UE operation of adjusting the number of activated antennas based on the configured maximum number of MIMO layers (or a case of operating with a smaller number of antennas than the number of antennas that the UE can assume according to the maximum number of MIMO layers notified to the base station through capability reporting or the maximum number of MIMO layers corresponding to a predefined default value, or a case of operating with the maximum number of MIMO layers smaller than the maximum number of MIMO layers notified to the base station through capability reporting, etc.) will be referred to as a 'second antenna mode'. The second antenna mode may also be called, for example, a power saving mode, a low power mode, or the like.

In some embodiments of the disclosure, the base station may configure the maximum number of MIMO layers to the UE, and further configure through higher layer signaling or L1 signaling whether the UE is allowed to operate in the second antenna mode. The UE may operate in the above-described second antenna mode only in case that the second antenna mode is configured by the base station. If the second antenna mode is not configured by the base station, the UE may operate in the first antenna mode.

In some embodiments of the disclosure, the base station may configure the maximum number of MIMO layers to the UE, and further the UE may implicitly determine whether the second antenna mode is configured. In case that the base station configures the maximum number of MIMO layers to a number smaller than the maximum number of MIMO layers reported by the UE, the UE may regard this as a command to operate in the second antenna mode. That is, the UE may operate by activating the number of antennas equal to or smaller than the maximum number of MIMO layers configured by the base station.

In some embodiments of the disclosure, through higher layer signaling, L1 signaling, or capability reporting, the UE may notify the base station whether it operates in the second antenna mode. Only when the UE notifies the base station to operate in the second antenna mode, the UE may operate in the above-described second antenna mode, and the base station may assume that the UE operates in the second antenna mode. If the UE does not notify the operation in the second antenna mode, the UE may operate in the first antenna mode, and the base station may also assume that the UE operates in the first antenna mode.

Embodiment 1-1

In an embodiment of the disclosure, as described above, the base station may configure different maximum numbers of MIMO layers for respective bandwidth parts to the UE. Alternatively, the base station may configure a different maximum number of MIMO layers for a specific bandwidth part to the UE.

In an embodiment of the disclosure, when the UE operates in the second antenna mode, and when a bandwidth part switch is performed between bandwidth parts for which the maximum number of MIMO layers are configured as different values, an additional delay due to a change in the number of antennas may be considered.

Figure 10:
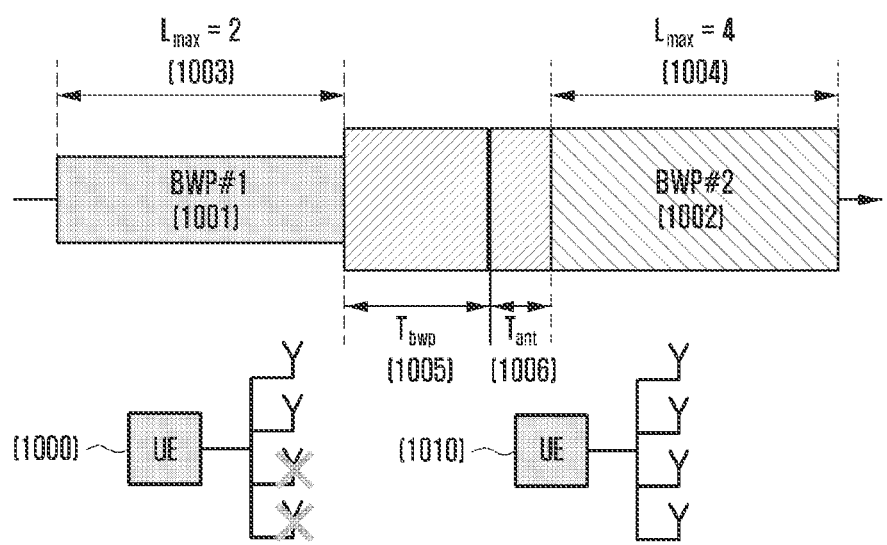
FIG. 10 is a diagram illustrating an example of an antenna adaptation method according to some embodiments of a delay time based on a bandwidth part switch in the disclosure.

FIG. 10 is a diagram illustrating an example of a delay according to a bandwidth part switch in the disclosure. In the example of FIG. 10, a bandwidth part #1 1001 and a bandwidth part #2 1002 are configured for the UE, the bandwidth part #1 1001 is configured with $L_{max}=2$ 1003, and the bandwidth part #2 1002 is configured with $L_{max}=4$ 1004. In the example of FIG. 10, when the UE operates in the second antenna mode, the UE may operate with two antennas 1000 in response to activation of the bandwidth part #1 1001, and operate with four antennas 1010 in response to activation of the bandwidth part #2 1002.

If the UE switches an operating bandwidth part from the bandwidth part #1 1001 to the bandwidth part #2 1002 due to causes such as instructions or configuration of the base station or expiration of a timer, the UE may also perform a change in the number of antennas as well as the bandwidth part switch. In this case, a delay ($T_{bwp}$) 1005 caused by the bandwidth part switch and a delay ($T_{ant}$) 1006 caused by the antenna change may occur. Therefore, when the antenna change is accompanied by the bandwidth part switch, an additional delay caused by the antenna change may be considered in a method of determining a bandwidth part switch delay of the UE.

Figure 11:
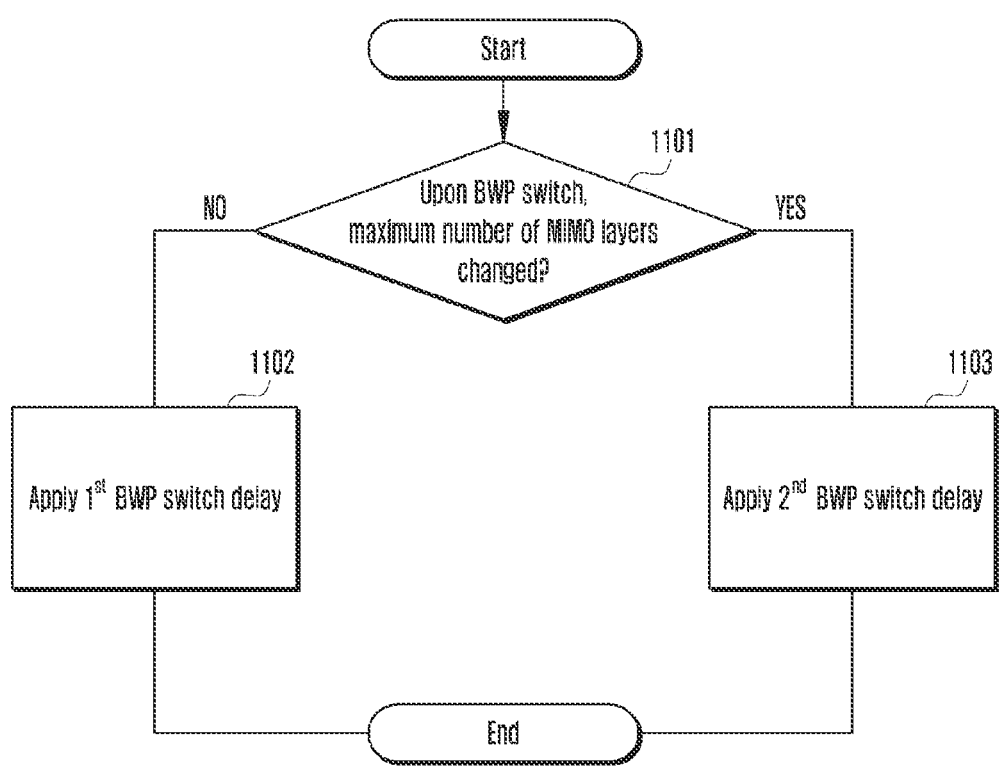
FIG. 11 is a diagram illustrating an example of a UE operation related to a bandwidth part switch according to some embodiments of the disclosure.

FIG. 11 is a diagram illustrating an example of a UE operation related to a bandwidth part switch according to some embodiments of the disclosure. At step 1101, the UE may determine whether the maximum number of MIMO layers is changed (this may be used interchangeably with a change in the number of activated antennas) when the bandwidth part is switched. For example, if the maximum number of MIMO layers configured in a bandwidth part before switch is different from the maximum number of MIMO layers configured in a bandwidth part after switch, the UE may determine that the condition of step 1101 is satisfied. If the UE determine at the step 1101 that the maximum number of MIMO layers is not changed when the bandwidth part is switched, the UE may assume a 'first bandwidth part switch delay' at step 1102. The 'first bandwidth part switch delay $(T_{bwp})$' may collectively refer to a bandwidth part switch delay that does not consider a delay due to a change in the number of antennas, and may correspond to, for example, $T_{BWP}$ described in Table 3.

If the UE determines at the step 1101 that the maximum number of MIMO layers is changed when the bandwidth part is switched, the UE may assume a 'second bandwidth part switch delay' at step 1103. The 'second bandwidth part switch delay $(T_{bwp,2})$' may collectively refer to a bandwidth part switch delay in consideration of a delay caused by a change in the number of antennas. For example, the second bandwidth part switch delay, $T_{bwp,2}$, may be defined as a function of $T_{bwp}$ and $T_{ant}$, and may be defined, for example, as follows.

$$T_{bwp,2} = T_{BWP} + T_{ant} \quad \text{[Equation 3]}$$

$$T_{bwp,2} = \max(T_{BWP}, T_{ant}), \text{ where } \max(A, B) \text{ is a function that outputs the larger value among } A \text{ and } B \quad \text{[Equation 4]}$$

In an embodiment of the disclosure, a bandwidth part to which the UE applies the second bandwidth part switch delay will be collectively referred to as the second bandwidth part.

When the UE receives DCI including an indicator indicating a switch to the second bandwidth part from the base station in a slot n, the UE may complete a switch to a new bandwidth part corresponding to the second bandwidth part indicated by the bandwidth part switch indicator at a time point not later than a slot $n+T_{bwp,2}$, and may perform transmission and reception of a data channel scheduled by that DCI in the new bandwidth part.

When the base station intends to schedule a data channel using a new bandwidth part, the base station may determine time domain resource allocation for the data channel in consideration of the bandwidth part switch delay $(T_{bwp,2})$ of the UE. That is, when scheduling a data channel in a new bandwidth part, the base station may schedule the data channel after the bandwidth part switch delay in a method of determining the time domain resource allocation for the data channel.

Accordingly, the UE may not expect that the time domain resource allocation information of the DCI indicating the bandwidth part switch indicates the value of a slot offset (K0 or K2) smaller than the bandwidth part switch delay $(T_{bwp,2})$ (that is, a case that the time domain resource allocation information indicates data channel scheduling before the bandwidth part switch delay expires). In addition, when the time domain resource allocation information of the DCI indicating the bandwidth part switch indicates the value of a slot offset (K0 or K2) smaller than the bandwidth part switch delay $(T_{bwp,2})$, the UE may ignore the DCI (that is, may not receive the data channel scheduled by the DCI).

Embodiment 1-2

In an embodiment of the disclosure, in case that the UE operates in the second antenna mode, the UE may not expect to perform uplink transmission (e.g., PUSCH or sounding reference signal (SRS) transmission) with an antenna port corresponding to a value greater than $L_{max}$ (or the number of antennas that the UE can assume according to the $L_{max}$ value). That is, when transmitting an uplink signal, the UE may use an antenna port corresponding to a value less than or equal to $L_{max}$.

For example, when the UE operates in the second antenna mode, the UE may not expect that at least one antenna port index of DMRS and SRS indicated by DCI (e.g., DCI format 0_0 or DCI format 0_1) for scheduling PUSCH from the base station is indicated with a value greater than $L_{max}$. For example, when $L_{max}$ is configured for the UE, the UE may expect that a DMRS antenna port index is always indicated from among $\{0, 1, \ldots, L_{max}-1\}$ by the DCI, and may not expect that an antenna port index is indicated from among $\{L_{max}, L_{max}+1, \ldots, M\}$. In the above, M may correspond to the maximum number of supportable antenna ports (e.g., the maximum value of antenna ports that may be indicated by the DCI). That is, the UE may determine that, among entries in the antenna port index table that can be indicated by the DCI, antenna port indexes corresponding to values greater than $L_{max}$, that is, entries including $\{L_{max}, L_{max}+1, \ldots, M\}$ are invalid. In another example, when transmitting the SRS, the UE may not expect to transmit the SRS using an antenna port having an index greater than $L_{max}$.

In an embodiment of the disclosure, when the UE operates in the second antenna mode, the UE may not expect that the number of antenna port indexes of at least one of DMRS and SRS is indicated as a value greater than $L_{max}$.

In an embodiment of the disclosure, when the UE operates in the second antenna mode, and in case that an antenna port index of at least one of DMRS and SRS indicated by the DCI (e.g., DCI format 0_0 or DCI format 0_1) for scheduling the PUSCH is indicated as a value greater than $L_{max}$, or the number of antenna port indexes is indicated as a value greater than $L_{max}$, the UE may perform an operation corresponding to at least one or a combination of the following operations.

[Operation 1]

The UE may determine that the received DCI is invalid, and ignore or discard the DCI.

[Operation 2]

The UE may perform transmission by assuming that the index of the antenna port indicated by the DCI is $L_{max}$ or included in $\{0, 1, \ldots, L_{max}-1\}$.

[Operation 3]

If the slot offset (K2) value in the PUSCH time domain resource allocation information of the DCI received by the UE is greater than the antenna change delay $(T_{ant})$, or if the offset of the SRS resource indicated by the received DCI (e.g., the slot offset value configured in the SRS resource indicated by the DCI or the slot offset value of the SRS resource indicated by the DCI) is greater than the antenna change delay $(T_{ant})$, the UE may determine that the DCI is valid, and perform uplink transmission through the antenna port indicated by the DCI. That is, if the time when uplink transmission should be performed according to the corresponding DCI is after the antenna change delay has elapsed, the UE may determine that the corresponding DCI is valid. If the slot offset (K2) value in the PUSCH time domain resource allocation information of the DCI received by the UE is not greater than the antenna change delay ($T_{ant}$), or if the offset of the SRS resource indicated by the received DCI is not greater than the antenna change delay ($T_{ant}$), the UE may determine that the DCI is invalid, and ignore or discard the received DCI.

Embodiment 1-3

Figure 12:
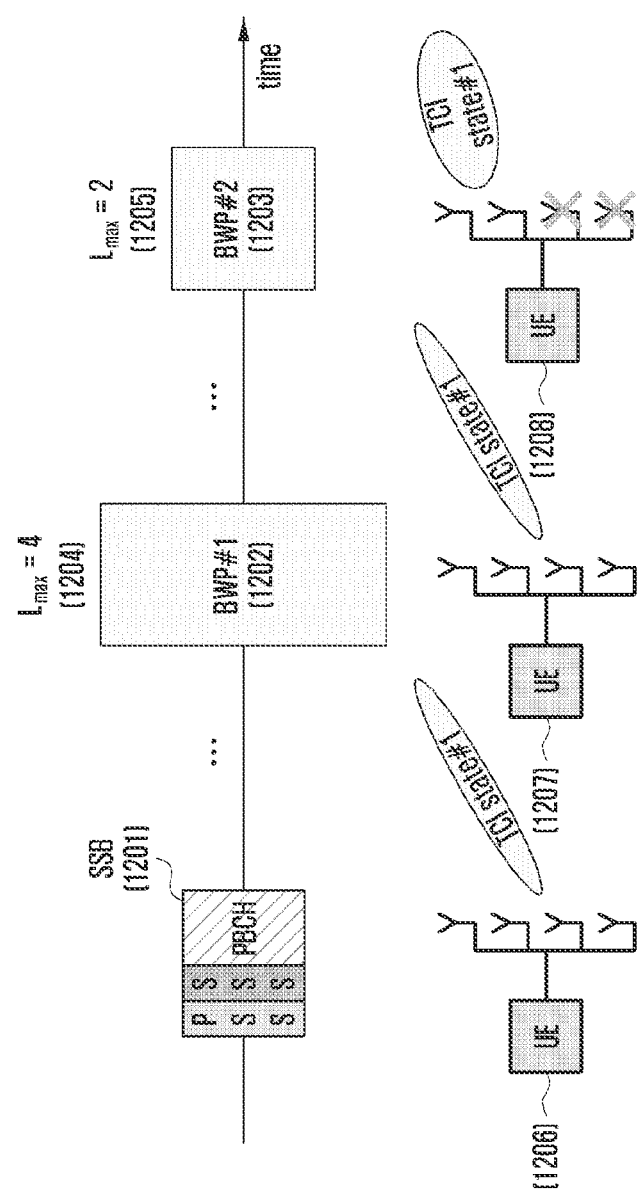
FIG. 12 is a diagram illustrating an example of an antenna adaptation method according to some embodiments of the disclosure.

FIG. 12 is a diagram illustrating an antenna adaptation operation of a UE according to some embodiments of the disclosure. In FIG. 12, for an SSB 1201, the UE may assume the first antenna mode (in the example of FIG. 12, four antennas 1206) and perform measurement and reporting. The measurement and reporting for the SSB 1201 of the UE may be performed in the initial access stage or performed based on configuration of the base station after connection. The UE may determine a reception beam for receiving the corresponding SSB through the step of measuring the SSB.

In addition, the base station may configure a TCI state to the UE, and the UE may know a QCL relationship between the reference RS (SSB, tracking reference signal (TRS), CSI-RS, etc.) configured with the TCI state and target RSs (e.g., PDCCH DMRS, PDSCH DMRS, CSI-RS, etc.). In the example of FIG. 12, a bandwidth part #1 1202 and a bandwidth part #2 1203 are configured for the UE, and the bandwidth part #1 1202 and the bandwidth part #2 1203 are configured as $L_{max}=4$ 1204 and $L_{max}=2$ 1205, respectively. In the example of FIG. 12, it is assumed that the UE operates in the second antenna mode, and thus the UE may operate with four antennas 1207 in the bandwidth part #1 1202 and operate with two antennas 1208 in the bandwidth part #2 1203.

In a situation where the UE operates in the bandwidth part #1 1202, if the UE receives from the base station an indication of a TCI state associated with the SSB 1201 as QCL-TypeD so as to decode the PDCCH or PDSCH, the UE can receive the corresponding PDCCH or PDSCH with the same reception beam as when measuring the SSB 1201 because the assumption on the number of antennas in the bandwidth part #1 1202 is identical with the assumption on the number of antennas when measuring the SSB 1201. However, in a situation where the UE operates in the bandwidth part #2 1203, if the UE receives from the base station an indication of a TCI state associated with the SSB 1201 as QCL-TypeD so as to decode the PDCCH or PDSCH, the UE cannot receive the corresponding PDCCH or PDSCH with the same reception beam as when measuring the SSB 1201 because the assumption on the number of antennas in the bandwidth part #2 1203 is different from the assumption on the number of antennas when measuring the SSB 1201.

As described above, if the antenna assumption of the UE at the time of receiving and measuring the SSB is different from the antenna assumption of the UE at the time when the UE receives another downlink channel, a problem that the reception beam may be varied may occur. Hereinafter, a method for solving the above problem is proposed through specific examples.

In an embodiment of the disclosure, when receiving (or measuring and reporting) the SSB, the UE may always assume the first antenna mode. That is, even when the UE is operating in the second antenna mode in the currently activated bandwidth part, the UE may change the mode to the first antenna mode at the time to have to receive the SSB. When the UE receives the SSB assuming the first antenna mode (e.g., the maximum number of antennas), there is an advantage in that the UE can utilize the reception beam obtained by receiving the corresponding SSB even when any other number of antennas is configured. This is because, due to the nature of a method for forming the reception beam, the reception beam obtained by using a relatively large number of antennas can be reused as a beam required for reception using a relatively small number of antennas after a certain partial adjustment is made.

Figure 13A:
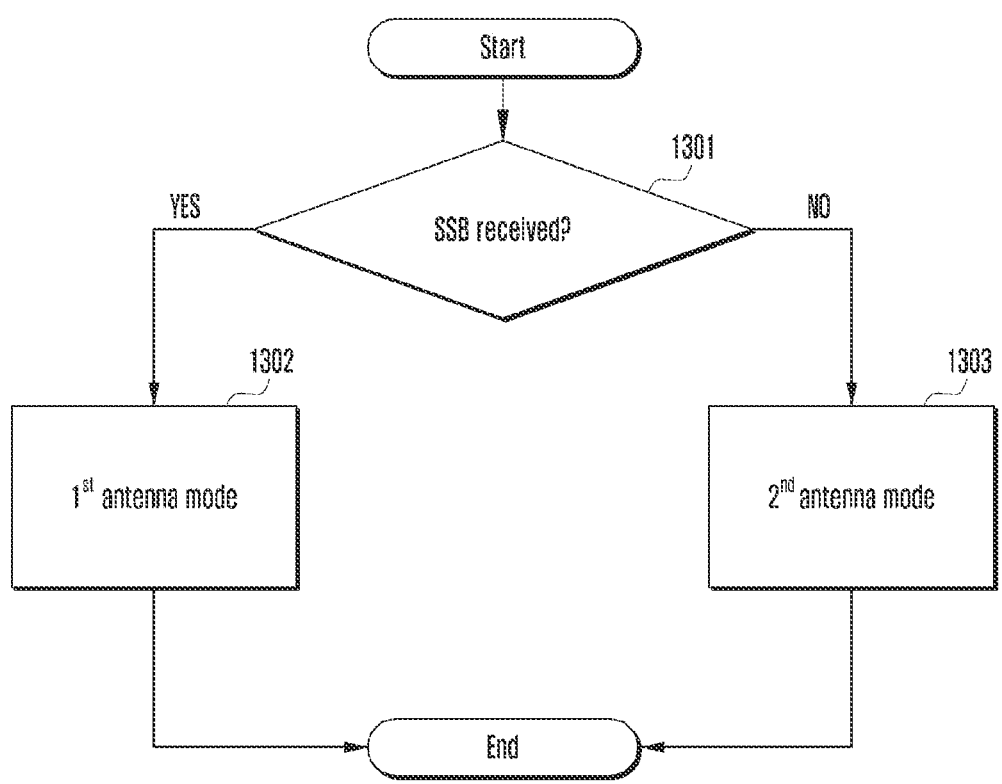
FIG. 13A is a diagram illustrating an example of a UE operation related to SSB reception according to some embodiments of the disclosure.

FIG. 13A is a diagram illustrating a UE operation related to SSB reception according to another embodiment of the disclosure. At step 1301, the UE determines whether to receive an SSB. If it is the time of receiving the SSB, the UE may operate in the first antenna mode at step 1302. If it is not the time of receiving the SSB, the UE may operate in the second antenna mode at step 1303.

In an embodiment of the disclosure, if a change in the number of antennas is required when the UE measures the SSB, the base station may configure a measurement gap to the UE, and the UE may perform measurement for the SSB in the configured measurement gap. For example, if the assumption on the number of antennas in the currently activated bandwidth part is X, and if the UE should change the number of antennas to Y for the SSB measurement, the measurement gap in consideration of the antenna change delay (Ta) may be required. That is, the measurement gap may include an effective measurement gap in which the UE performs the SSB measurement, and the antenna change delay.

If the SSB does not exist in the activated bandwidth part, the base station may configure the measurement gap for the SSB measurement to the UE, and the UE may measure the corresponding SSB in the measurement gap. If the UE performs not only the bandwidth part switch but also the antenna change for the SSB measurement, a longer measurement gap should be configured in consideration of additional delay. For example, if the time required for conventional RF tuning is X ms, the measurement gap may be configured under assuming a total delay of (X+Y) ms in consideration of the antenna change delay Y ms.

Alternatively, a period corresponding to the effective measurement gap (the remaining time interval excluding the delay time caused by RF tuning or antenna change from the time interval corresponding to the configured measurement gap) may be shortened. For example, if the time required for conventional RF tuning is X ms, and assuming a total delay of (X+Y) ms in consideration of the antenna change delay Y ms, the UE may determine the time excluding (X+Y) ms as the effective measurement gap and perform the SSB measurement during the corresponding time.

Specifically, if an antenna change is not required for the SSB measurement, the base station may configure a measurement gap of total Z ms for the SSB measurement to the UE. Then the UE may consume X ms (e.g., the first X/2 ms and the last X/2 ms in Z ms), which is a part of the total Z ms measurement gap, for RF tuning, and perform the SSB measurement in the remaining (Z−X) ms. If an antenna change is required for the SSB measurement, the base station may configure a measurement gap of total Z ms for the SSB measurement to the UE. Then the UE may consume X+Y ms (e.g., the first (X+Y)/2 ms and the last (X+Y)/2 ms in Z ms), which is a part of the total Z ms measurement gap, for both RF tuning and antenna change, and perform the SSB measurement in the remaining (Z−(X+Y)) ms.

If the SSB exists in the activated bandwidth part, and if the assumption on the number of antennas in the activated bandwidth part is different from the assumption on the number of antennas when receiving the SSB (for example, in case that $L_{max}$ configured in the activated bandwidth part is different from $L_{max}$ reported as UE capability, or any other case that the antenna assumption is different), the base station may configure the measurement gap to the UE, and the UE may receive the SSB in the measurement gap. In this case, the measurement gap may be configured as a value greater than the antenna change delay, and the UE may determine the remaining time interval excluding the antenna change delay as an effective measurement gap and perform the SSB measurement during the corresponding time.

If the SSB exists in the activated bandwidth part, and if the assumption on the number of antennas in the activated bandwidth part is identical with the assumption on the number of antennas when receiving the SSB (for example, in case that $L_{max}$ configured in the activated bandwidth part is equal to $L_{max}$ reported as UE capability, or any other case that the antenna assumption is identical), the base station may not configure the measurement gap to the UE, and the UE may receive the SSB in a state where the measurement gap is not configured.

Figure 13B:
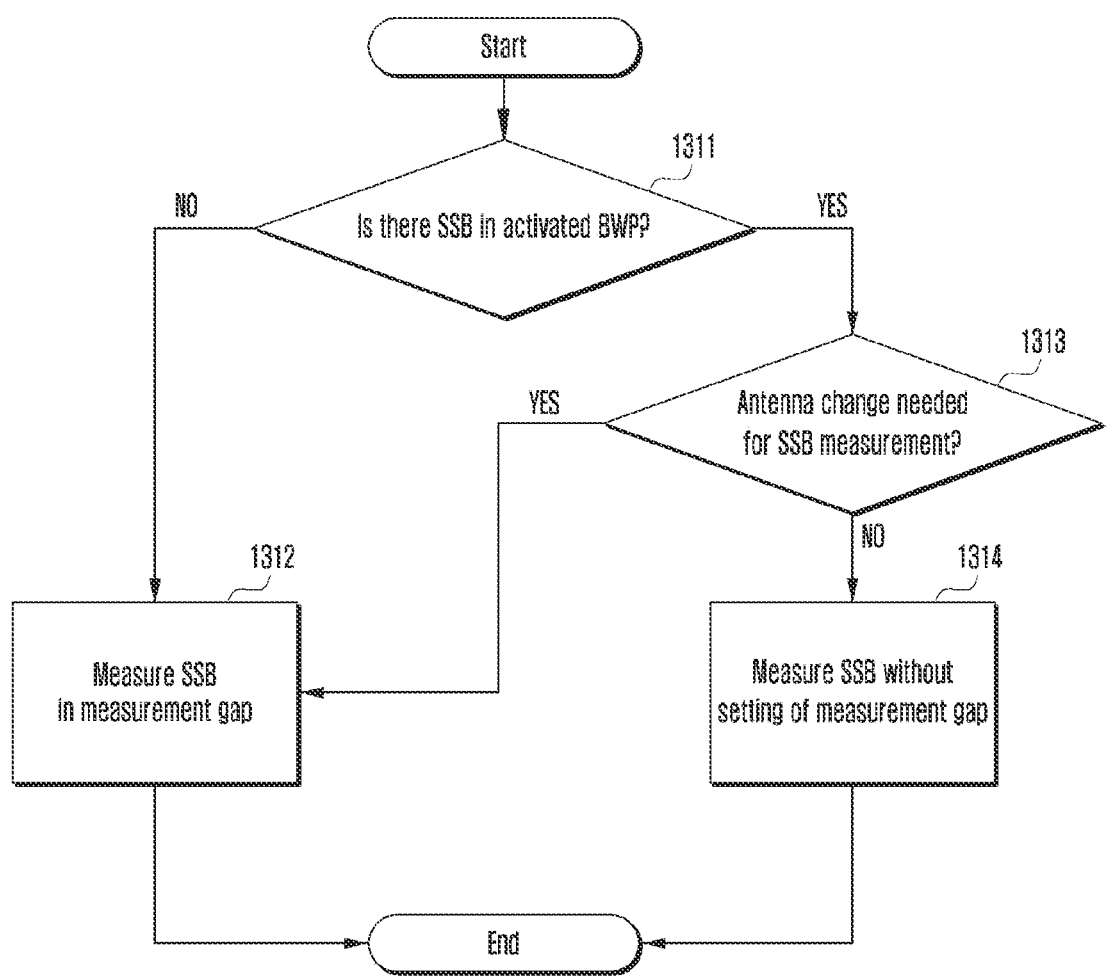
FIG. 13B is a diagram illustrating another example of a UE operation related to SSB reception according to some embodiments of the disclosure.

FIG. 13B is a diagram illustrating another UE operation related to SSB reception according to an embodiment of the disclosure. At step 1311, the UE may determine whether the SSB exists in the activated bandwidth part. If the SSB does not exist in the activated bandwidth part, the UE may measure the SSB in the measurement gap at step 1312. If the SSB exists in the activated bandwidth part, the UE may determine at step 1313 whether an antenna change is required for the corresponding SSB measurement. If it is necessary to change the antenna, the UE may measure the SSB in the measurement gap at the step 1312. If the antenna change is not required, the UE may measure the SSB at step 1314 in a state where the measurement gap is not configured.

Embodiment 1-3-1

In an embodiment of the disclosure, the UE may not expect to operate in the second antenna mode for a bandwidth part including the SSB. That is, for the bandwidth part including the SSB, the UE may not expect that an $L_{max}$ value less than the number of antennas assumed when the SSB is received is configured. Therefore, when the bandwidth part including the SSB is activated and the UE needs to measure the SSB in the corresponding bandwidth part, the UE may always perform the SSB measurement in a state where the measurement gap is not configured.

Embodiment 1-4

In an embodiment of the disclosure, when receiving (or measuring and reporting) the SSB, the UE may assume the second antenna mode. That is, the UE may receive and measure the SSB based on the same assumption as the assumption on the number of antennas in the currently activated bandwidth part for the SSB measurement. Accordingly, the UE may perform the SSB measurement in a state where the measurement gap is not configured.

Embodiment 1-5

In an embodiment of the disclosure, for a bandwidth part operating in the second antenna mode (or when $L_{max}$ of a value smaller than $L_{max}$ reported as capability by the UE is configured), the UE may not expect that a downlink channel and signal (e.g., PDCCH, PDCCH DMRS, PDSCH, PDSCH DMRS, etc.) being in a QCL-TypeD relationship with the SSB will be received. For example, the UE may not expect that a TCI state having a reference RS (e.g., CSI-RS) that is in a QCL-TypeD relationship with the SSB will be indicated for decoding during downlink transmission (e.g., PDCCH or PDSCH). Also, the UE may not expect that a TC state in which the SSB is configured as the reference RS will be indicated for decoding during downlink transmission (e.g., PDCCH or PDSCH). That is, for the bandwidth part operating in the second antenna mode, the UE may expect that only TCI states composed of CSI-RSs transmitted in the corresponding bandwidth part will be indicated by the base station. In this case, the UE may not need to receive the SSB in order to identify information about a beam applied to downlink transmission.

In an embodiment of the disclosure, for a bandwidth part operating in the second antenna mode (or when $L_{max}$ of a value smaller than $L_{max}$ reported as capability by the UE is configured), the UE may not expect that PDCCH or PDSCH being in a QCL-TypeD relationship with the SSB will be received. If a TCI state (or QCL-TypeD relationship, that is, beam-related information) for the configured downlink channel (PDCCH or PDSCH) is not clear, the UE may assume a default TCI state (or QCL-TypeD relationship) for the corresponding downlink channel. In this case, the default TCI state may correspond to, for example, a TCI state having the lowest (or highest) index among TC states configured via higher layer signaling.

For example, for a CORESET #0, if the UE does not receive a MAC CE activation command for the TCI state of the CORESET #0, the UE may assume that a DMRS transmitted in the CORESET #0 is QCLed with an SSB identified in the initial access procedure or the non-contention based random access procedure which is not triggered by a PDCCH command. In this case, if the UE operates in the second antenna mode, a new TCI state to be assumed by the UE may be required because the UE cannot assume that the PDCCH is QCLed with the SSB.

Therefore, if the assumption on the number of antennas in the bandwidth part in which the UE monitors the CORESET #0 is different from the assumption on the number of antennas when the SSB identified in the initial access procedure or the non-contention based random access procedure which is not triggered by a PDCCH command (for example, $L_{max}$ configured in the bandwidth part in which the CORESET #0 is configured is different from the number of antennas assumed when the UE receives the SSB) as the UE operates in the second antenna mode, and if the UE does not receive the MAC CE activation command for the TCI state of CORESET #0, the UE may assume that the DMRS is QCLed with a reference signal corresponding to a TCI state having the lowest (or highest) index among TCI states configured in the CORESET #0 with respect to the DMRS transmitted in the CORESET #0, and receive the PDCCH in the CORESET #0.

In another example, when the UE operates in the second antenna mode, for a CORESET configured with an index of other value than 0 (CORESET #X), if the UE has not been configured for the TCI state for the CORESET #X, or has been configured for one or more TCI states, but fails to receive the MAC CE activation command to activate one of them, the UE may assume that the DMRS transmitted in the CORESET #X has been QCLed with a TC state having the lowest (or highest) index among TCI states configured in the CORESET #X.

In still another example, when the UE operates in the second antenna mode, if the TCI state is configured to the UE via higher layer signaling for the PDSCH and the activation command through the MAC CE has not yet been received, the UE may assume that 1 is the DMRS of the PDSCH is QCLed with a reference signal corresponding to a TCI state having the lowest (or highest) index among TC states configured in the PDSCH.

The above-described embodiment 1-5 may be limitedly applied only when the number of antennas assumed for SSB measurement is smaller than the number of antennas currently assumed or the number of antennas assumed for receiving a downlink channel (PDCCH or PDSCH).

Alternatively, the above-described embodiment 1-5 may be limitedly applied only when the number of antennas assumed for SSB measurement is different from (i.e., smaller or greater than) the number of antennas currently assumed or the number of antennas assumed for receiving a downlink channel (PDCCH or PDSCH)

The embodiments described above are not mutually exclusive, and some of them may also be performed in combination.

Figure 14:
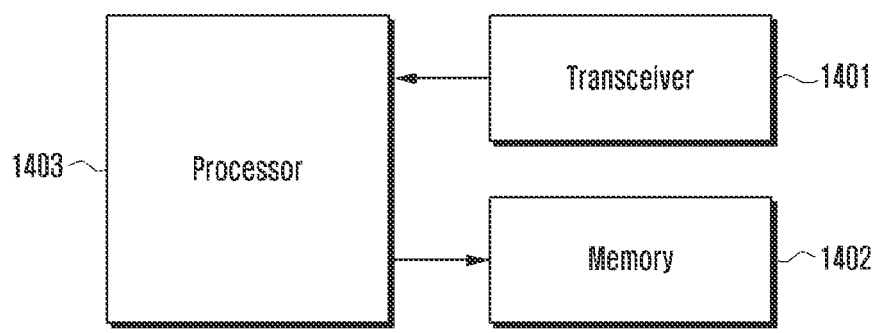
FIG. 14 is a diagram illustrating an internal structure of a UE according to embodiments of the disclosure.

FIG. 14 is a diagram illustrating a structure of a UE according to an embodiment of the disclosure.

Referring to FIG. 14, the UE may include a transceiver 1401, a memory 1402, and a processor 1403. However, components of the UE are not limited to the above-described example. For example, the UE may include more or fewer components than the aforementioned components. In addition, the transceiver 1401, the memory 1402, and the processor 1403 may be implemented in the form of a single chip.

According to an embodiment of the disclosure, the transceiver 1401 may transmit/receive a signal to/from the base station. The signal may include control information and data. To this end, the transceiver 1401 may include an RF transmitter for up-converting and amplifying the frequency of a signal to be transmitted, and an RF receiver for low-noise amplifying a received signal and down-converting the frequency. In addition, the transceiver 1401 may receive a signal through a radio channel and output it to the processor 1403, and also transmit a signal outputted from the processor 1403 through a radio channel.

According to an embodiment of the disclosure, the memory 1402 may store programs and data necessary for the operation of the UE. In addition, the memory 1402 may store control information or data included in a signal transmitted and received by the UE. The memory 1402 may be configured as a storage medium or a combination of storage media, such as ROM, RAM, hard disk, CD-ROM, and DVD. Also, the memory 1402 may be composed of a plurality of memories. According to an embodiment of the disclosure, the memory 1402 may store a program for controlling and receiving an operation for reducing power consumption of the UE.

According to an embodiment of the disclosure, the processor 1403 may control a series of processes in which the UE may operate based on the above-described embodiments of the disclosure. For example, the processor 1403 may control the power consumption reduction operation of the UE based on embodiments of the disclosure.

Specifically, the processor 1403 may receive, from the base station, configuration information about at least one of the maximum number of MIMO layers, an antenna mode, and a configuration gap, determine the number of antennas to be operated based on the configuration information, and control each configuration of the UE to operate the antenna.

In addition, the processor 1403 may include a plurality of processors, and perform the adaptive antenna operation method of the UE based on embodiments of the disclosure by executing a program stored in the memory 1402.

Figure 15:
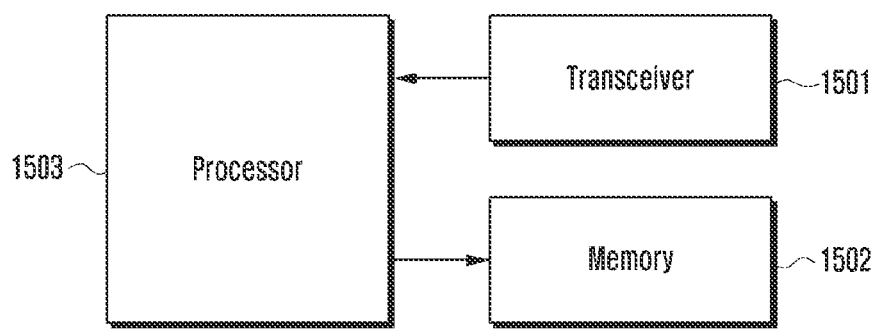
FIG. 15 is a diagram illustrating an internal structure of a base station according to embodiments of the disclosure.

FIG. 15 is a diagram illustrating a structure of a base station according to an embodiment of the disclosure.

Referring to FIG. 15, the base station may include a transceiver 1501, a memory 1502, and a processor 1503. However, components of the base station are not limited to the above-described example. For example, the base station may include more or fewer components than the aforementioned components. In addition, the transceiver 1501, the memory 1502, and the processor 1503 may be implemented in the form of a single chip.

According to an embodiment of the disclosure, the transceiver 1501 may transmit/receive a signal to/from the UE. The signal may include control information and data. To this end, the transceiver 1501 may include an RF transmitter for up-converting and amplifying the frequency of a signal to be transmitted, and an RF receiver for low-noise amplifying a received signal and down-converting the frequency. In addition, the transceiver 1501 may receive a signal through a radio channel and output it to the processor 1503, and also transmit a signal outputted from the processor 1503 through a radio channel.

According to an embodiment of the disclosure, the memory 1502 may store programs and data necessary for the operation of the base station. In addition, the memory 1502 may store control information or data included in a signal transmitted and received by the base station. The memory 1502 may be configured as a storage medium or a combination of storage media, such as ROM, RAM, hard disk, CD-ROM, and DVD. Also, the memory 1502 may be composed of a plurality of memories. According to an embodiment of the disclosure, the memory 1502 may store a program for generating and transmitting control information of the base station for reducing UE power consumption.

According to an embodiment of the disclosure, the processor 1503 may control a series of processes in which the base station may operate based on the above-described embodiments of the disclosure. For example, the processor 1503 may control each component of the base station to generate and transmit configuration information about at least one of the maximum number of MIMO layers, an antenna mode, and a configuration gap.

In addition, the processor 1503 may include a plurality of processors, and perform the configuration information transmission method based on embodiments of the disclosure by executing a program stored in the memory 1502.

The methods according to claims or embodiments described in the disclosure may be implemented in hardware, software, or a combination of hardware and software.

In case of implementation in software, a computer-readable storage medium that stores one or more programs (or software modules) may be provided. Such one or more programs stored in the computer-readable storage medium are configured for execution by one or more processors equipped in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other type optical storage devices, a magnetic cassette, or any combination thereof. In addition, each of such memories may be included as plural components.

In addition, the program may be stored in an attachable storage device that is accessible through a communication network such as the Internet, an Intranet, a local area network (LAN), a wide LAN (WLAN), a storage area network (SAN), or any combination thereof. Such a storage device may access an apparatus that performs embodiments of the disclosure via an external port. Further, a separate storage device on the communication network may access an apparatus that performs embodiments of the disclosure.

In the above-discussed embodiments of the disclosure, elements included in the disclosure are expressed as a singular or plural form depending on the discussed specific embodiments. However, it is to be understood that such singular or plural representations are selected appropriately according to situations presented for the convenience of description, and the disclosure is not limited to the singular or plural form. Even expressed in a singular form, an element may be construed as a plurality of elements, and vice versa.

Meanwhile, embodiments of the disclosure and the accompanying drawings are only examples presented in order to easily describe the disclosure and facilitate comprehension of the disclosure, but are not intended to limit the scope of the disclosure. That is, it is apparent to a person skilled in the art that other modifications based on technical ideas of the disclosure can be implemented. In addition, the above-described embodiments may be used in combination with each other as needed. For example, it may be possible to apply the first embodiment and the second embodiment in combination, or to apply a part of the first embodiment and a part of the second embodiment in combination. In addition, the above embodiments and their modifications may be implemented in the LTE system, the 5G system, and the like.

The invention claimed is:

1. A method of a terminal in a wireless communication system, the method comprising:
    identifying operating in a second antenna mode;
    determining whether a synchronization signal/physical broadcast channel block (SSB) to be measured exists in an activated bandwidth part; and
    in case that the SSB to be measured does not exist in the activated bandwidth part, measuring the SSB in a first measurement gap configured by a base station,
    wherein the second antenna mode is a mode operating with a configured maximum number of multi-input multi-output (MIMO) layers smaller than a maximum number of MIMO layers notified to the base station by the terminal through capability reporting, and
    wherein the first measurement gap includes a time $T_1$ for an antenna change, a time $T_2$ for radio frequency (RF) tuning, and an effective measurement time to measure the SSB.

2. The method of claim 1, further comprising:
    in case that the SSB to be measured exists in the activated bandwidth part, determining whether a change in a number of activated antennas is necessary for the SSB measurement;
    measuring the SSB in a second measurement gap configured by the base station in case that the change in the number of activated antennas is necessary, and measuring the SSB in an interval other than a measurement gap in case that the change in the number of activated antennas is not necessary,
    wherein the second measurement gap includes the time $T_1$ for the antenna change and the effective measurement time to measure the SSB.

3. The method of claim 1, further comprising:
    transmitting capability reporting information related to the maximum number of MIMO layers of the terminal to the base station; and
    receiving maximum MIMO layer configuration information from the base station,
    wherein the maximum MIMO layer configuration information is configured for each cell or each bandwidth part.

4. The method of claim 3, further comprising:
    in case that a number of antennas to be activated based on the maximum MIMO layer configuration information is smaller than the maximum number of MIMO layers of the terminal, determining that the second antenna mode is configured.

5. The method of claim 3, further comprising:
    receiving second antenna mode configuration information from the base station through higher layer signaling; and
    identifying operating in the second antenna mode when receiving the second antenna mode configuration information.

6. The method of claim 3, further comprising:
    receiving downlink control information (DCI) related to a specific number of demodulation reference signal (DMRS) antenna ports or sounding reference signal (SRS) antenna ports from the base station; and
    ignoring the DCI in case that the specific number of DMRS antenna ports or SRS antenna ports is greater than a number of antennas to be activated based on the maximum MIMO layer configuration information.

7. A method of a base station in a wireless communication system, the method comprising:
    receiving capability reporting information related to a maximum number of multi-input multi-output (MIMO) layers of a terminal from the terminal; and
    transmitting maximum MIMO layer configuration information to the terminal,
    wherein the maximum MIMO layer configuration information is configured for each cell or each bandwidth part, and
    wherein in case that a number of MIMO layers based on the maximum MIMO layer configuration information is smaller than the maximum number of MIMO layers based on the capability reporting information, a second antenna mode is configured to the terminal.

8. The method of claim 7, further comprising:
    transmitting downlink control information (DCI) related to a specific number of demodulation reference signal (DMRS) antenna ports or sounding reference signal (SRS) antenna ports to the terminal,
    wherein the specific number of DMRS antenna ports or SRS antenna ports is not greater than a number of antennas to be activated based on the maximum MIMO layer configuration information.

9. A terminal in a wireless communication system, the terminal comprising:
    a transceiver; and
    a controller configured to identify operating in a second antenna mode, to determine whether a synchronization signal/physical broadcast channel block (SSB) to be measured exists in an activated bandwidth part, and in case that the SSB to be measured does not exist in the activated bandwidth part, to measure the SSB in a first measurement gap configured by a base station, wherein the second antenna mode is a mode operating with a configured maximum number of multi-input multi-output (MIMO) layers smaller than a maximum number of MIMO layers notified to the base station by the terminal through capability reporting, and wherein the first measurement gap includes a time $T_1$ for an antenna change, a time $T_2$ for radio frequency (RF) tuning, and an effective measurement time to measure the SSB.

10. The terminal of claim 9, wherein the controller is further configured to, in case that the SSB to be measured exists in the activated bandwidth part, determine whether a change in a number of activated antennas is necessary for the SSB measurement, to measure the SSB in a second measurement gap configured by the base station in case that the change in the number of activated antennas is necessary, and to measure the SSB in an interval other than a measurement gap in case that the change in the number of activated antennas is not necessary, wherein the second measurement gap includes the time $T_1$ for the antenna change and the effective measurement time to measure the SSB.

11. The terminal of claim 9, wherein the controller is further configured to transmit capability reporting information related to the maximum number of MIMO layers of the terminal to the base station, and to receive maximum MIMO layer configuration information from the base station, wherein the maximum MIMO layer configuration information is configured for each cell or each bandwidth part.

12. The terminal of claim 11, wherein the controller is further configured to, in case that a number of antennas to be activated based on the maximum MIMO layer configuration information is smaller than the maximum number of MIMO layers of the terminal, determine that the second antenna mode is configured.

13. The terminal of claim 11, wherein the controller is further configured to receive downlink control information (DCI) related to a specific number of demodulation reference signal (DMRS) antenna ports or sounding reference signal (SRS) antenna ports from the base station, and to ignore the DCI in case that the specific number of DMRS antenna ports or SRS antenna ports is greater than a number of antennas to be activated based on the maximum MIMO layer configuration information.

14. A base station in a wireless communication system, the base station comprising:

a transceiver; and a controller configured to receive capability reporting information related to a maximum number of multi-input multi-output (MIMO) layers of a terminal from the terminal, and to transmit maximum MIMO layer configuration information to the terminal, wherein the maximum MIMO layer configuration information is configured for each cell or each bandwidth part, and in case that a number of MIMO layers based on the maximum MIMO layer configuration information is smaller than the maximum number of MIMO layers based on the capability reporting information, a second antenna mode is configured to the terminal.

15. The base station of claim 14, wherein the controller is further configured to transmit downlink control information (DCI) related to a specific number of demodulation reference signal (DMRS) antenna ports or sounding reference signal (SRS) antenna ports to the terminal, wherein the specific number of DMRS antenna ports or SRS antenna ports is not greater than a number of antennas to be activated based on the maximum MIMO layer configuration information.

* * * * *